United States Patent
McHale et al.

(10) Patent No.: US 6,385,203 B2
(45) Date of Patent: *May 7, 2002

(54) COMMUNICATION SERVER APPARATUS AND METHOD

(75) Inventors: John F. McHale; Robert H. Locklear, Jr., both of Austin; James R. Sisk, Cedar Park, all of TX (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/005,504

(22) Filed: Jan. 8, 1998

Related U.S. Application Data

(63) Continuation-in-part of application No. 08/828,421, filed on Mar. 28, 1997, and a continuation-in-part of application No. 08/781,441, filed on Jan. 10, 1997, which is a continuation-in-part of application No. 08/625,769, filed on Mar. 29, 1996, now Pat. No. 5,668,857.

(51) Int. Cl.[7] .................. H04L 12/56; H04L 12/66; H04L 5/16

(52) U.S. Cl. ............... 370/401; 370/352; 370/252; 375/220

(58) Field of Search ................... 370/351, 352, 370/468, 676, 506, 333, 281, 480, 401, 252–254; 375/260, 261, 222, 220, 219; 379/93.32, 93.07, 93.28, 39.14, 93.08, 93.29

(56) References Cited

U.S. PATENT DOCUMENTS

| | | | |
|---|---|---|---|
| 3,532,827 A | 10/1970 | Ewin | 179/18 |
| 3,821,484 A | 6/1974 | Sternung et al. | 179/18 EB |
| 4,002,849 A | 1/1977 | Kotler et al. | 179/18 EB |
| 4,282,408 A | 8/1981 | Stauers | 179/18 FA |
| 4,438,511 A | 3/1984 | Baran | 370/19 |
| 4,665,514 A | 5/1987 | Ching et al. | 370/400 |
| 4,679,227 A | 7/1987 | Hughes-Hartogs | 379/98 |
| 4,731,816 A | 3/1988 | Hughes-Hartogs | 379/98 |
| 4,757,495 A | 7/1988 | Decker et al. | 370/76 |
| 4,782,512 A | 11/1988 | Hutton | 379/98 |

(List continued on next page.)

FOREIGN PATENT DOCUMENTS

| | | | | |
|---|---|---|---|---|
| JP | 6376648 | 4/1988 | | H04L/11/20 |
| WO | WO 97/37458 | 10/1997 | | |

OTHER PUBLICATIONS

Horst Hessenmuller, et al., Zugangsnetzstrukturen fur interaktive Videodienste (Teil 1), Fernmelde Ingenieur, Der, vol. 48, No. 8, XP000647017, Aug., 1994, Germany, pp. 1–32 (with English translation).

Horst Hessenmuller, et al., Zugangsnetzstrukturen fur interaktive Videodienste (Teil 2), Fernmelde Ingenieur, Der, vol. 48, No. 9, XP000619688, Sep., 1994, Germany, pp. 1–28 (with English translation).

*Primary Examiner*—Wellington Chin
*Assistant Examiner*—Steven Nguyen
(74) *Attorney, Agent, or Firm*—Baker Botts L.L.P.

(57) ABSTRACT

A communication server maintains profile information on twisted pair lines in a profile table. This profile information may be generated in a training session and then retrieved to train a modem or transceiver unit to communicate data over the associated twisted pair line using XDSL communication techniques.

58 Claims, 18 Drawing Sheets

U.S. PATENT DOCUMENTS

| | | | |
|---|---|---|---|
| 4,833,706 A | 5/1989 | Hughes-Hartogs | 379/98 |
| 4,841,561 A | 6/1989 | Hill | 379/97 |
| 4,980,897 A | 12/1990 | Decker et al. | 375/38 |
| 4,985,889 A | 1/1991 | Frankish et al. | 370/94.1 |
| 5,025,469 A | 6/1991 | Bingham | 379/98 |
| 5,054,034 A | 10/1991 | Hughes-Hatogs | 375/8 |
| 5,119,402 A | 6/1992 | Ginzyburg et al. | 375/17 |
| 5,119,403 A | 6/1992 | Krishnan | 375/39 |
| 5,134,611 A | 7/1992 | Steinka et al. | 370/79 |
| 5,185,763 A | 2/1993 | Krishnan | 735/39 |
| 5,198,818 A | 3/1993 | Samueli et al. | 341/144 |
| 5,199,071 A | 3/1993 | Abe et al. | 379/985 |
| 5,202,884 A | 4/1993 | Close et al. | 370/94.1 |
| 5,206,886 A | 4/1993 | Bingham | 375/97 |
| 5,210,530 A | 5/1993 | Kammerer et al. | 340/825.08 |
| 5,214,650 A | 5/1993 | Renner et al. | 370/110.1 |
| 5,222,077 A | 6/1993 | Krishnan | 375/39 |
| 5,228,062 A | 7/1993 | Bingham | 375/97 |
| 5,247,347 A | 9/1993 | Litteral et al. | 358/85 |
| 5,282,155 A | 1/1994 | Jones | 364/724.19 |
| 5,285,474 A | 2/1994 | Chow et al. | 375/13 |
| 5,293,402 A | 3/1994 | Crespo et al. | 735/14 |
| 5,295,159 A | 3/1994 | Kerpez | 735/38 |
| 5,331,670 A | 7/1994 | Sorbara et al. | 375/111 |
| 5,337,348 A | 8/1994 | Yamazaki et al. | 379/94 |
| 5,339,355 A | 8/1994 | Mori et al. | 379/94 |
| 5,341,474 A | 8/1994 | Gelman et al. | 395/200 |
| 5,345,437 A | 9/1994 | Ogawa | 370/13 |
| 5,367,540 A | 11/1994 | Kakuishi et al. | 375/103 |
| 5,371,532 A | 12/1994 | Gelman et al. | 348/7 |
| 5,379,441 A | 1/1995 | Watanabe et al. | 395/800 |
| 5,390,239 A | 2/1995 | Morris et al. | 379/93 |
| 5,400,322 A | 3/1995 | Hunt et al. | 370/19 |
| 5,404,388 A | 4/1995 | Eu | 379/24 |
| 5,408,260 A | 4/1995 | Arnon | 348/6 |
| 5,408,522 A | 4/1995 | Ikehata et al. | 379/98 |
| 5,408,527 A | 4/1995 | Tsutsu | 379/211 |
| 5,408,614 A | 4/1995 | Thornton | 395/275 |
| 5,410,264 A | 4/1995 | Lechleider | 327/311 |
| 5,410,343 A | 4/1995 | Coddington et al. | 348/7 |
| 5,412,660 A | 5/1995 | Chen et al. | 370/110.1 |
| 5,414,455 A | 5/1995 | Hooper et al. | 348/7 |
| 5,414,733 A | 5/1995 | Turner | 375/233 |
| 5,422,876 A | 6/1995 | Turudic | 370/15 |
| 5,428,608 A | 6/1995 | Freeman et al. | 370/60.1 |
| 5,430,793 A | 7/1995 | Ueltzen et al. | 379/98 |
| 5,434,863 A | 7/1995 | Onishi et al. | 370/85.13 |
| 5,440,335 A | 8/1995 | Beveridge | 348/13 |
| 5,442,390 A | 8/1995 | Hooper et al. | 348/7 |
| 5,444,703 A | 8/1995 | Gagliardi et al. | 370/60.1 |
| 5,452,306 A | 9/1995 | Turudic et al. | 370/110.1 |
| 5,453,779 A | 9/1995 | Dan et al. | 348/7 |
| 5,461,415 A | 10/1995 | Wolf et al. | 348/7 |
| 5,461,616 A | 10/1995 | Suzuki | 370/79 |
| 5,461,624 A | 10/1995 | Mazzola | 370/85.13 |
| 5,461,640 A | 10/1995 | Gatherer | 375/231 |
| 5,469,495 A | 11/1995 | Beveridge | 379/56 |
| 5,473,599 A | 12/1995 | Li et al. | 370/16 |
| 5,475,735 A | 12/1995 | Williams et al. | 379/59 |
| 5,477,263 A | 12/1995 | O'Callaghan et al. | 348/7 |
| 5,479,447 A | 12/1995 | Chow et al. | 375/260 |
| 5,495,483 A | 2/1996 | Grube et al. | 370/95.1 |
| 5,506,868 A | 4/1996 | Cox et al. | 375/222 |
| 5,513,251 A | 4/1996 | Rochkind et al. | 379/93 |
| 5,517,488 A | 5/1996 | Miyazaki et al. | 370/16 |
| 5,528,585 A | 6/1996 | Cooley et al. | 370/56 |
| 5,546,379 A | 8/1996 | Thaweethai et al. | 370/17 |
| 5,555,244 A | 9/1996 | Gupta et al. | 370/60.1 |
| 5,574,724 A | 11/1996 | Bales et al. | 370/68.1 |
| 5,583,862 A | 12/1996 | Callon | 370/397 |
| 5,583,872 A | 12/1996 | Albrecht et al. | 370/476 |
| 5,598,406 A | 1/1997 | Albrecht et al. | 370/296 |
| 5,600,712 A | 2/1997 | Hanson et al. | 379/142 |
| 5,602,902 A | 2/1997 | Satterlund et al. | 379/59 |
| 5,604,741 A | 2/1997 | Samueli et al. | 370/402 |
| 5,610,910 A | * 3/1997 | Focsaneanu et al. | 370/351 |
| 5,612,957 A | 3/1997 | Gregerson et al. | 370/401 |
| 5,619,505 A | * 4/1997 | Brube | 370/476 |
| 5,631,897 A | 5/1997 | Pacheco et al. | 370/237 |
| 5,649,001 A | 7/1997 | Thomas et al. | 379/93.07 |
| 5,668,857 A | 9/1997 | McHale | 379/93.07 |
| 5,678,004 A | 10/1997 | Thaweethai | 595/187.01 |
| 5,680,394 A | * 10/1997 | Bingham et al. | 370/294 |
| 5,687,176 A | 11/1997 | Wisniewski et al. | 370/476 |
| 5,737,364 A | 4/1998 | Cohen et al. | 375/220 |
| 5,751,701 A | * 5/1998 | Langberg et al. | 370/281 |
| 5,756,280 A | 5/1998 | Soora et al. | 455/4.2 |
| 5,770,950 A | 6/1998 | Zurcher et al. | 326/30 |
| 5,781,617 A | 7/1998 | McHale et al. | 379/93.14 |
| 5,790,550 A | * 8/1998 | Peeters et al. | 370/480 |
| 5,799,017 A | 8/1998 | Gupta et al. | 370/419 |
| 5,805,587 A | * 9/1998 | Norris | 370/389 |
| 5,812,786 A | 9/1998 | Seaholtz et al. | 395/200.63 |
| 5,822,374 A | * 10/1998 | Levin | 375/260 |
| 5,852,633 A | * 12/1998 | Levin et al. | 375/200 |
| 5,852,655 A | 12/1998 | McHale et al. | 379/93.14 |
| 5,909,463 A | * 6/1999 | Johnson et al. | 375/220 |
| 5,987,069 A | * 11/1999 | Furukawa et al. | 375/285 |
| 6,002,722 A | * 12/1999 | Wu | 375/295 |
| 6,101,216 A | * 8/2000 | Henderson | 375/222 |
| 6,163,599 A | * 12/2000 | McHale | 379/93.28 |

* cited by examiner

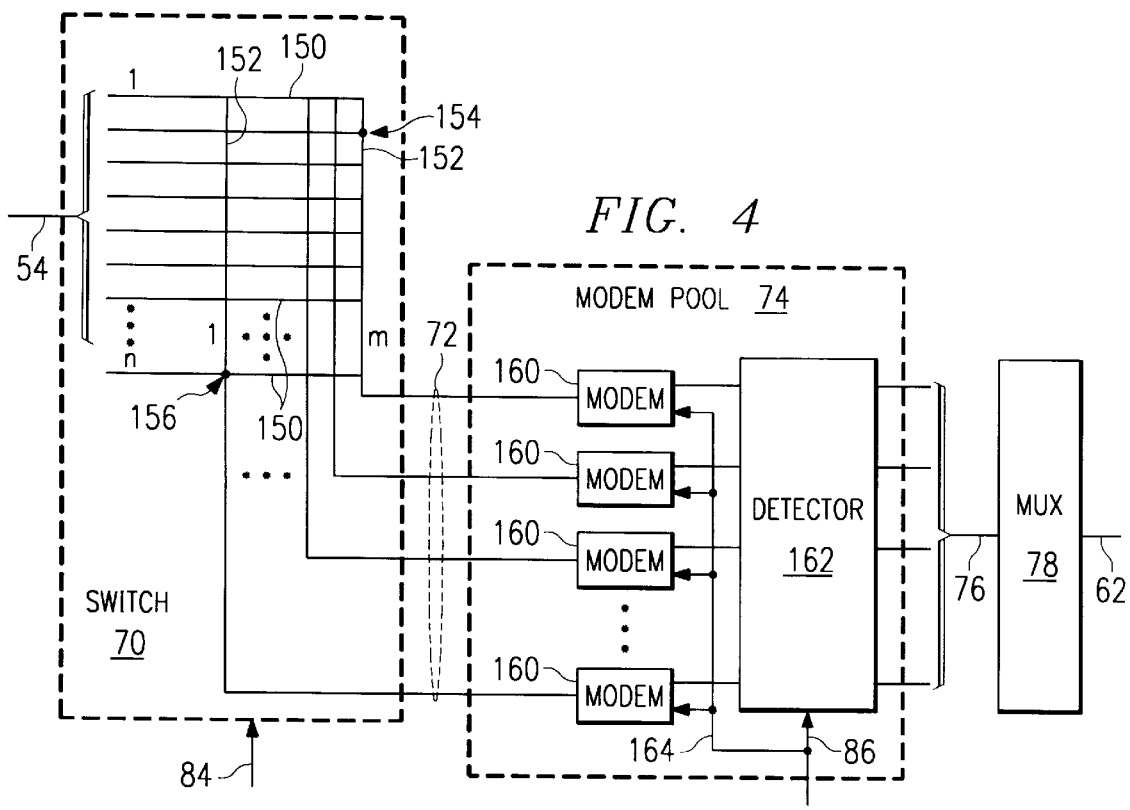
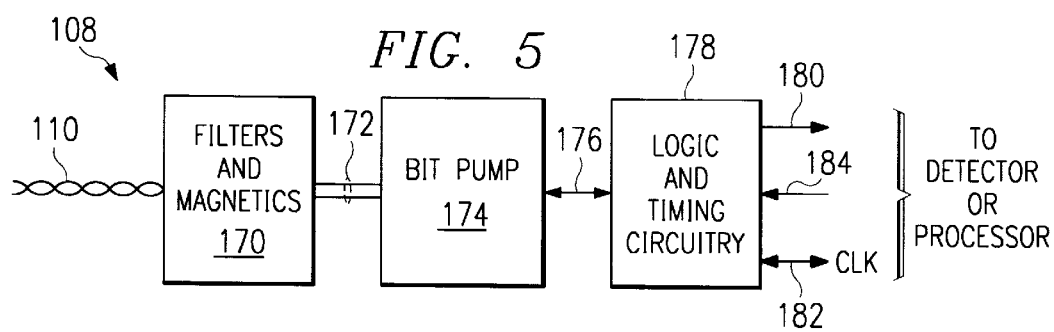
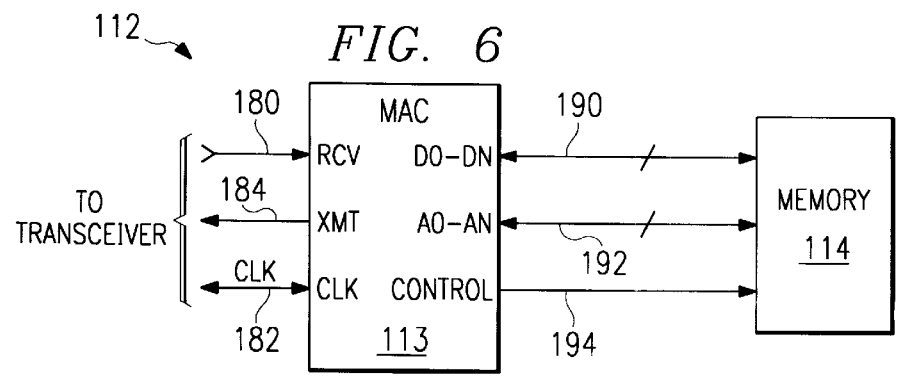

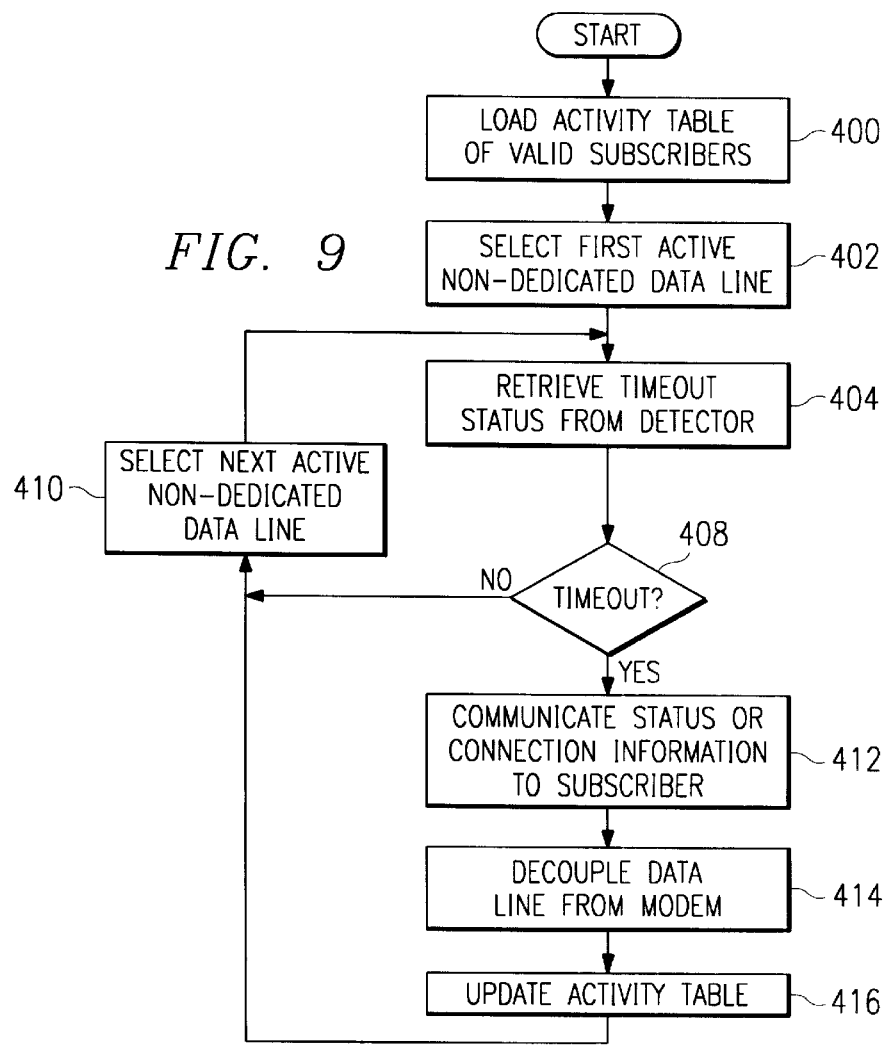

| SUBSCRIBER LINE | SUBSCRIBER ID | CIRCUIT ID | LOGICAL MODEM POOL | MAXIMUM RATE (UP/DOWN) | | MARGIN (UP/DOWN) | | COEFFICIENTS/ PARAMETERS |
|---|---|---|---|---|---|---|---|---|
| 1.15.3 | 512-555-1212 | ~~~~ | 3 | 1 Mbps | 4 Mbps | 32dB | 30dB | COEFFICIENT DATA |
| 2.01.4 | 800-123-4567 | ~~~~ | 2 | 250 Kbps | 2 Mbps | 35dB | 31dB | PARAMETER DATA |
| 5.20.4 | 214-555-1212 | ~~~~ | 4 | 2 Mbps | 8 Mbps | 30dB | 28dB | ~~~~ |
| ... | ... | ... | ... | ... | | ... | | ... |

FIG. 19

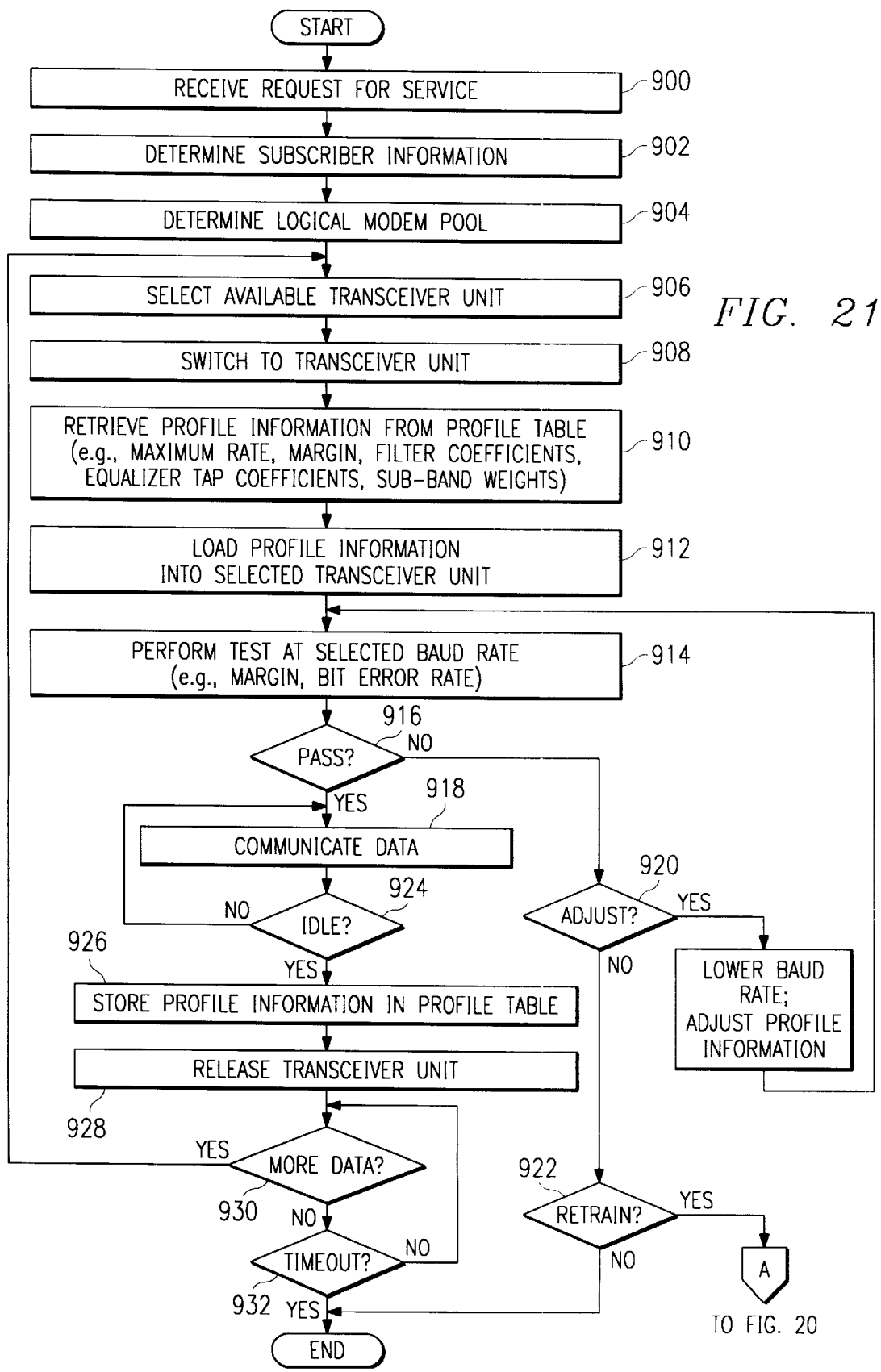

COMMUNICATION SERVER APPARATUS AND METHOD

CROSS-REFERENCE TO RELATED APPLICATIONS

This application is a continuation-in-part of U.S. patent application Serial No. 08/828,421, filed Mar. 28, 1997, and entitled "Communication Server Apparatus and Method," pending, which is a continuation-in-part of U.S. patent application Serial No. 08/625,769, filed Mar. 29, 1996, and entitled "Communication Server Apparatus and Method," now U.S. Pat. No. 5,668,857, and a continuation-in-part of U.S. patent application Serial No. 08/781,441, filed Jan. 10, 1997, and entitled "Communication Server Apparatus Having Distributed Switching and Method," pending.

TECHNICAL FIELD OF THE INVENTION

This invention relates in general to data communication, and more particularly to a communication server apparatus and method.

BACKGROUND OF THE INVENTION

A communication server provides access to communication facilities. For example., a communication server having a bank of modems may provide subscriber access to the modems for data communication. A communication server may be associated with its own dedicated communication network, or with an existing communication network, such as the public switched telephone network (PSTN).

As communication networks provide greater connectivity and access to information, there is an increasing demand for data communication at higher rates. One solution to provide increased data rates replaces existing twisted pair wiring with high bandwidth media, such as coaxial cables or fiber optic links. Other solutions adopt improved communication techniques using the existing hardware infrastructure. For example, digital subscriber line (XDSL) technology provides higher bandwidth data service over existing twisted pair wiring.

To deliver data service to the subscriber, a communication server may provide a dedicated or permanent connection to its communication facilities. For example, an existing communication server at a central office provides enough communication facilities to simultaneously service all PSTN subscribers. However, all telephone subscribers may not desire data service. Furthermore, the subscribers that desire data service may not simultaneously access the communication server.

SUMMARY OF THE INVENTION

In accordance with the present invention, the disadvantages and problems associated with communication servers have been substantially reduced or eliminated. In particular, a communication server apparatus and method are disclosed that provide data service using profile information for twisted pair lines in an XDSL environment.

According to one aspect of the present invention, a communication server coupled to a number of twisted pair lines includes a number of XDSL transceiver units. A line profile table has profile information for the twisted pair lines. A system controller receives profile information for a twisted pair line from the line profile table and provides the retrieved profile information to an XDSL transceiver unit coupled to the twisted pair line in preparation for XDSL communication.

In accordance with another aspect of the present invention, an XDSL transceiver unit includes an XDSL chipset that couples to a twisted pair line and a number of registers associated with the XDSL chipset. A microcontroller coupled to the XDSL chipset and the registers receives profile information for the twisted pair line from an external device and stores the profile information in the registers in preparation for XDSL communication using the twisted pair line.

Important technical advantages of the present invention include a communication server that provides data service to a number of subscribers using a reduced number of XDSL communication facilities. Over-subscription of data service is accomplished by selectively coupling a number of twisted pair data lines to a reduced number of XDSL modems. A controller polls the data lines simultaneously or in succession, in groups or individually, to determine which subscribers of the communication system need data service. Upon detecting a need for data service on a selected data line, the controller directs a switch to couple the selected data line to an available modem. The communication server may then provide data service suitable for high bandwidth applications, such as video-on-demand, multimedia, or Internet access.

Another important technical advantage of the present invention includes a communication server that provides over-subscribed XDSL data service using the existing infrastructure of the public switched telephone network (PSTN). Asymmetric digital subscriber line (ADSL), symmetric digital subscriber line (SDSL), high-speed digital subscriber line (HDSL), very high-speed digital subscriber line (VDSL), or other suitable XDSL technology can provide higher bandwidth data service over existing twisted pair wiring. These technologies may support data service simultaneously with traditional telephone service using a separation technique, such as frequency division multiplexing. In one embodiment, a splitter divides each incoming twisted pair subscriber line into a twisted pair phone line and a twisted pair data line. The phone line is coupled to a telephone switch to provide telephone service and the data line is coupled to the communication server to provide over-subscribed XDSL data service. The communication server and splitter may be located at a central office, remote terminal, or other point of presence of the data service provider.

Another important technical advantage of the present invention includes the management and monitoring of XDSL data service provided to subscribers. To accomplish this, the communication server maintains an activity table to determine status information on twisted pair data lines and XDSL modems. In addition, the communication server can track subscriber usage, monitor subscriber information and generate billing and demographic information. In a particular embodiment, an activity detector disconnects a subscriber after a predetermined period of inactivity to release a modem for use by another subscriber.

An important technical advantage of the present invention is the distribution of the switching function to allow scalability of the number of supported data lines and over-subscription of XDSL modems.

A further important technical advantage of the present invention includes isolating the switch from the data lines and subscriber lines. The switch can thereby operate without constraints imposed by technical requirements for interaction with the data lines and subscriber lines. For example, isolation of the switching matrix can allow CMOS switches to be used rather than more expensive solid state relays or mechanical relays.

Yet another important technical advantage of the present invention includes the ability to provide a two-wire isolated interface that can use a single switch to couple a data line to a specific modem. The present invention thus allows one switch per modem per data line configuration. The isolation system of the present invention can transform the data line impedance to an intermediate impedance in order to increase system performance.

A further important technical advantage of the present invention includes the maintenance of profile information for one or more twisted pair lines coupled to an XDSL transceiver unit. This profile information may specify filter coefficients, equalizer tap values, sub-band weighting, data rates, margins, and other information that reflects electrical and/or physical parameters of the twisted pair lines. In a particular embodiment, the XDSL transceiver unit performs a training session on the twisted pair line at a variety of bands and rates to generate profile information. The profile information is stored in an appropriate non-volatile memory, such as a memory maintained by the system controller or other device external to the XDSL transceiver unit. The XDSL transceiver unit receives the stored profile information to engage in XDSL communication without a protracted training period. The XDSL transceiver unit may also perform a full or partial retraining of the line as needed.

The profile information may include, for example, digital filter coefficients used in carrier-less amplitude phase (CAP) modulation, discrete multi-tone (DMT) modulation, or other suitable modulation. In a particular embodiment, a communication server includes a number of XDSL transceiver units arranged on cards that communicate with one or more system controller cards to receive profile information of associated twisted pair lines serviced by the communication server. Line interface modules (LIMs) couple the twisted pair lines to selected XDSL transceiver units under the control of the system controller. In this embodiment, the system controller maintains profile information associated with each twisted pair line serviced by the communication server. Other important technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description taken in conjunction with the accompanying drawings, in which:

FIG. 4 illustrates in more detail the switch and modem pool of the communication server;

FIG. 5 illustrates in more detail the transceiver in the controller of the communication server;

FIG. 6 illustrates in more detail the detector in the controller of the communication server;

FIG. 7 illustrates an activity table used by the controller of the communication server;

FIG. 9 is a flow chart of a method to decouple a data line from a modem in the communication server;

FIG. 19 illustrates an exemplary line profile table that stores profile information;

FIG. 21 is a flowchart of a method for retrieving profile information in preparation for XDSL communication.

DETAILED DESCRIPTION OF THE INVENTION

Figure 1:
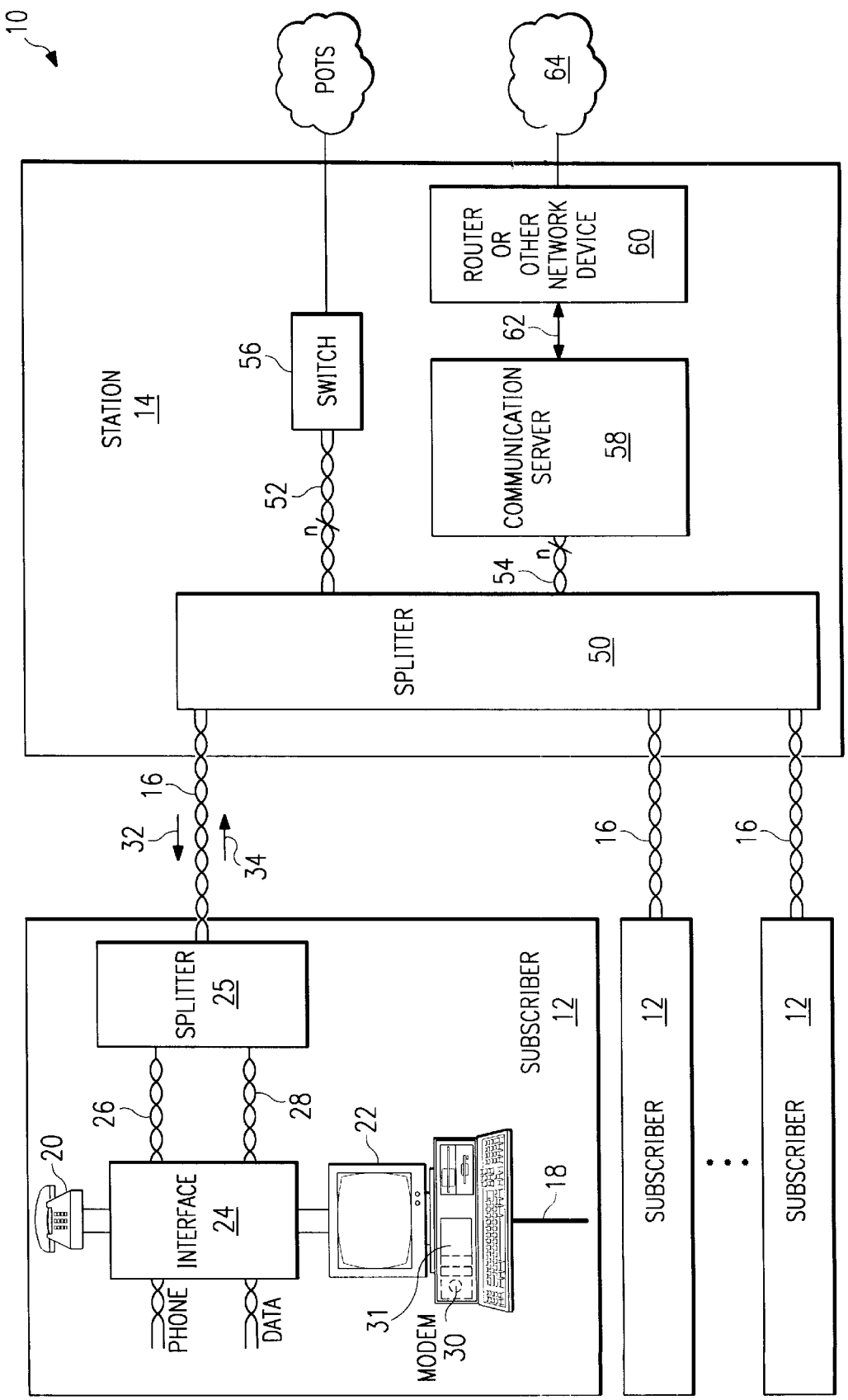
FIG. 1 illustrates a communication system that provides data service.

FIG. 1 illustrates a communication system 10 that provides both telephone and data service to a subscriber 12. A station 14 is coupled to subscriber 12 using subscriber line 16. In operation, station 14 provides telephone service, data service, or both telephone and data service to subscriber 12 using subscriber line 16. Subscriber line 16 may support simultaneous telephone and data service using twisted pair wiring.

Subscriber 12 includes a telephone 20 and a computer 22, both coupled to an interface 24. A splitter 25 is coupled to subscriber line 16 and operates to split subscriber line 16 into a twisted pair phone line 26 and a twisted pair data line 28. Phone line 26 is coupled to telephone 20 using interface 24. Similarly, data line 28 is coupled to computer 22 using interface 24. Subscriber 12 refers to one or more components at the subscriber premises shown in FIG. 1, as well as the user of these components.

Telephone 20 is a traditional telephone transceiver, a cordless telephone transceiver, or any other device suitable for allowing communication over telephone line 26. Computer 22 comprises a mainframe device, mini-frame device, server, desktop personal computer, notebook personal computer, or other suitable computing device having an XDSL modem 30 that communicates data using data line 28. Modem 30 couples to other components of computer 22 using a Peripheral Component Interconnect (PCI) bus, an Industrial Standard Architecture (ISA) bus, a Personal Computer Memory Card International Association (PCMCIA) interface, or any other suitable technology that provides input/output capability to computer 22. The selection and design of modem 30 for computer 22 may depend on the type or functionality of computer 22, as well as the data service rate supported by data line 28.

Modem 30 transmits and receives data in communication system 10 using any suitable digital subscriber line technology, referred to generally as XDSL. Modem 30 also supports Ethernet, Fast Ethernet, V.35 data protocol, frame relay, asynchronous transfer mode (ATM), switched multi-megabit data service (SMDS), high-level data link control (HDLC), serial line Internet protocol (SLIP), point-to-point protocol (PPP), transmission control protocol/Internet protocol (TCP/IP), or any other appropriate protocol, collectively referred to as digital protocol. For example, computer 22 may include a network interface 31 to receive data from station 14 or to further communicate data to a local area network (LAN), wide area network (WAN), or other suitable network coupled to computer 22 using link 18. In general, modem 30 translates information between the communication protocol supported by communication system 10 and the digital protocol supported by computer 22.

Communication system 10 includes numerous other twisted pair subscriber lines 16 coupled to other subscribers 12. In an exemplary embodiment, station 14 comprises a central office or other device in the public switched telephone network (PSTN) that provides phone and data service to a number of subscribers, with each subscriber 12 including one or more components described above at its premises. The subscribers and subscriber lines in communication system 10 are referred to collectively in the plural as subscribers 12 and subscriber lines 16.

Interface 24 couples phone line 26 to telephone 20, and data line 28 to computer 22. In one embodiment, interface 24 provides additional couplings to additional telephones 20 and computers 22 at subscriber 12. Splitter 25 is a passive or active splitter that divides subscriber line 16 into phone line 26 and data line 28 of the same type. Throughout this description, phone line 26 and data line 28 may be referred to specifically, or collectively as part of subscriber line 16.

Subscriber line 16 couples subscriber 12 to station 14. Subscriber line 16 comprises twisted pair wiring that is commonly installed at subscriber premises and as the local loop in many public switched telephone networks (PSTNs). Subscriber line 16 may be unshielded twisted pair (UTP), shielded twisted pair (STP), or other suitable type or category of twisted pair wiring made of copper or other suitable material. Phone line 26 and data line 28 associated with subscriber line 16 may be the same or different type or category of twisted pair wiring.

Station 14 includes an optional splitter 50 coupled to subscriber line 16. Like splitter 25 at subscriber 12, splitter 50 at station 14 is a passive or active splitter that divides subscriber line 16 into a twisted pair phone line 52 and a twisted pair data line 54. Phone line 52 and data line 54 associated with subscriber line 16 may be the same or different type or category of twisted pair wiring. In a particular embodiment, a telephone switch 56 at station 14 is coupled to phone line 52 to provide plain old telephone system (POTS) service to subscriber 12. Telephone switch 56 also represents other components in the PSTN or other suitable voice communication network, such as switches, wireline or wireless links, satellites, microwave uplinks, and other communication facilities to deliver telephone service to subscriber 12.

A communication server 58 is coupled to splitter 50 using data line 54. As described in detail below, communication server 58 manages the provisioning of data service to subscriber 12. Communication server 58 performs off-hook detection on the local loops formed by subscriber lines 16 to determine if subscriber 12 desires data service. Specifically, communication server 58 couples a modem to subscriber line 16 upon detecting a need for data service from computer 22. Communication server 58 tracks subscriber usage, monitors subscriber information, and generates billing and demographic information, as described below.

The data off-hook detector in communication server 58 can use one of several methods to determine whether subscriber 12 should be connected to an XDSL modem. The off-hook detector may monitor direct current voltages, electrical tones, data link frames, or any other protocol or data sequencing to determine whether subscriber 12 needs data access. The off-hook detector in communication server 58 may monitor electrical tones generated by modem 30 while in the process of training, notching, equalizing, or performing any other task that puts electrical tones onto subscriber line 16 and its associated data line 54. Communication server 58 may also detect frames or packets. These frames or packets could be Ethernet, ATM, HDLC, or any suitable data communications frame format. The off-hook detector in communication server 58 could also examine various protocols such as TCP/IP, PPP, or any other suitable network protocol or data stream.

Communication server 58 multiplexes modem digital outputs into a multiplexed digital line 62 for delivery to a router or other network device 60. In one embodiment, multiplexed digital line 62 carries a single bidirectional and multiplexed signal for all subscribers 12 in communication system 10. Signals on multiplexed digital line 62 may support any appropriate digital protocol used by network device 60. A communication network 64, such as a global communication network like the Internet, is coupled to network device 60. Communication network 64 may also include a synchronous optical network (SONET), a frame relay network, an asynchronous transfer mode (ATM) network, a T1, T3, E1, or E3 network, or any other suitable communication network.

One important technical advantage of the present invention is the ability to over-subscribe the XDSL communication facilities of communication server 58 to service an increasing number of subscribers 12 in communication system 10. Communication server 58 may couple to the same number and type of data lines 54 as represented by subscriber lines 16 in communication system 10. For example, if station 14 services one thousand subscribers 12 using twisted pair subscriber lines 16, then data lines 54 coupled to communication server 58 may represent as many as one thousand twisted pair lines.

In one embodiment, not all subscribers 12 in communication system 10 desire access to data service provided by communication server 58. Splitter 50 need not provide a separate data line 54 for those subscribers 12 that only desire phone service from telephone switch 56. As more subscribers 12 desire access to data service, the XDSL communication capabilities of splitter 50 and communication server 58 may be supplemented in a modular and cost effective manner to meet the demand.

Communication system 10 supports data service over subscriber lines 16 using asymmetric digital subscriber line (ADSL), symmetric digital subscriber line (SDSL), high-speed digital subscriber line (HDSL), very high-speed digital subscriber line (VDSL), or any other suitable technology that allows high rate data service over twisted pair wiring that forms the local loops to subscribers 12. All of these technologies are referred to collectively as XDSL or communication protocol. In one embodiment, subscriber line 16 and components of subscriber 12 and station 14 support communication using ADSL techniques that comply with ANSI standard T1.413. In another embodiment, ADSL communication over subscriber line 16 may be performed using the carrier-less amplitude phase modulation (CAP) technique developed by AT&T Corporation.

In an ADSL communication system, the downlink data rate 32 from station 14 to subscriber 12 is greater than the uplink data rate 34 from subscriber 12 to station 14. This allows high bandwidth communication to subscriber 12, while still providing lower bandwidth communication to station 14. ADSL communication is well-adapted for applications, such as video-on-demand, multimedia, and Internet access, that transfer large volumes of information to subscriber 12 in response to shorter requests for information. In one specific embodiment, downlink data rate 32 is approximately 1.5 Mbps, whereas uplink data rate 34 is approximately 750 kbps. In other embodiments, downlink data rate 32 may be six Mbps or more depending on the specific XDSL technology employed, the quality and length of subscriber line 16, and the contribution of noise and distortion from other components in communication system 10.

To support high bandwidth data service, local loops formed by subscriber lines 16 may have a maximum length imposed by the XDSL modulation technique or hardware. For example, an existing ADSL implementation operates over local loops of 12,000 feet or less. However, the present invention contemplates, expects, and specifically includes additional communication technologies that extend the maximum length, bandwidth, and quality of communication between subscribers 12 and station 14.

XDSL technology provides data service using existing subscriber lines 16 without interrupting normal telephone service. This is accomplished by a separation technique, such as frequency division multiplexing (FDM), to separate frequencies that provide telephone service from those frequencies that provide data service. Dynamic noise cancellation techniques and a guard band between the data and phone service frequencies ensure reliable and simultaneous access to data and phone service over subscriber line 16. For example, subscriber 12 may simultaneously engage in both a data communication session using computer 22 and a voice conversation using telephone 20.

In operation, communication system 10 provides phone and data service to subscriber 12. Subscriber 12 accesses phone service by using telephone 20 to initiate a call. Upon going off-hook, communication system 10 establishes a circuit between telephone 20 and telephone switch 56 using interface 24, phone line 26, splitter 25, subscriber line 16, splitter 50, and one of phone lines 52. Upon establishing this telephone circuit, subscriber 12 using telephone 20 receives POTS service from telephone switch 56.

To access data service, subscriber 12 turns on computer 22, executes a program, such as an Internet browser, or performs some other affirmative or passive activity that generates a request, command, data packet, electrical tone, or other suitable information or signal that indicates a need for data service. In one embodiment, modem 30 repetitively transmits the need for data service in a request interval, where the request interval comprises the time length of the request and the silent interval until the next request. Alternatively, the need for data service indicated at subscriber 12 may be based on the establishment of a closed circuit between subscriber 12 and station 14 or on one or more analog or digital signal transitions. Modem 30 communicates the need to communication server 58 at station 14 using interface 24, data line 28, splitter 25, subscriber line 16, splitter 50, and one of data lines 54.

As described in detail below, communication server 58 detects the need for data service and selects an XDSL modem at communication server 58 to communicate with XDSL modem 30 in computer 22. Upon establishing a modem connection between modem 30 in computer 22 and a selected modem in communication server 58, subscriber 12 engages in a data communication session with communication network 64 using network device 60. In addition, computer 22 may function as a gateway into communication network 10 for other devices coupled to network interface 31 using link 18.

XDSL technology allows simultaneous use of subscriber line 16 for both phone and data service using the existing twisted pair wiring in communication system 10. In one embodiment, splitter 50, communication server 58, and network device 60 are located at a central office of the PSTN to provide an efficient and modular provisioning of XDSL data service and voice service to subscribers 12. In a data-only embodiment, communication server 58 and network device 60 may be located at a central office, end office, remote terminal, private premises, or any other location that provides a point of presence of network 64. Splitter 50, communication server 58, and network device 60 may be located at any site or sites remote from subscribers 12 without departing from the scope of the present invention.

Figure 2:
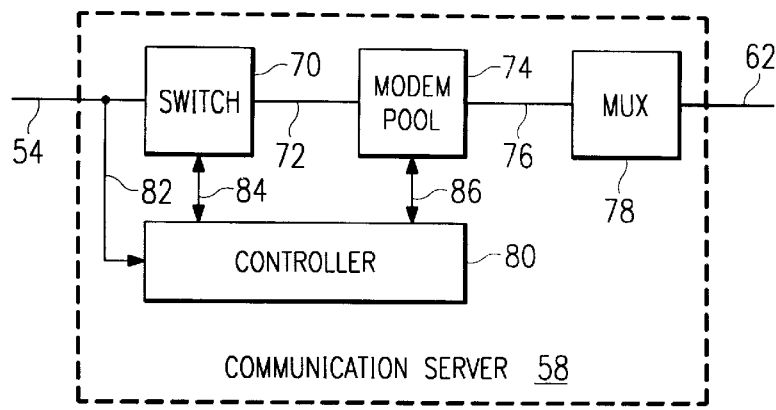
FIG. 2 illustrates a communication server in the communication system.

FIG. 2 illustrates in more detail communication server 58. Data lines 54 associated with subscriber lines 16 are coupled to a switch 70. In one embodiment, each data line 54 corresponds to an associated subscriber line 16 and its related subscriber 12. Switch 70 couples selected data lines 54 to output lines 72 that in turn couple to modem pool 74. The format of signals on data lines 54 and output lines 72 is the same as the format of signals on subscriber lines 16. For example, if communication system 10 adopts XDSL technology, signals on data lines 54 and output lines 72 are modulated using XDSL techniques.

Modems in modem pool 74 convert signals in an appropriate XDSL communication protocol into digital data in an appropriate digital protocol on digital lines 76. A multiplexer 78 is coupled to digital lines 76 and combines the signals on digital lines 76 into a fewer number of multiplexed digital lines 62. In one embodiment, multiplexer 78 combines information for delivery to network device 60 using a single multiplexed digital line 62.

A controller 80 is coupled to data lines 54 using a link 82. Controller 80 is also coupled to switch 70 and modem pool 74 using links 84 and 86, respectively. Controller 80 detects a need for data service generated by subscribers 12 and communicated over subscriber lines 16 to data lines 54. In response, controller 80 using link 84 directs switch 70 to couple a selected subset of data lines 54 to selected output lines 72 that couple to modems in modem pool 74. For example, controller 80 may monitor one thousand data lines 54 to provide XDSL data services using one hundred modems in modem pool 74.

Controller 80 also receives information from modem pool 74 using link 86 to determine status information of modems in modem pool 74. As digital lines 76 become inactive for a predetermined period of time, modem pool 74 detects this inactivity and generates a timeout indication for communication to controller 80. Upon receiving the timeout indication, controller 80 releases the inactive modem in modem pool 74 for later use.

In operation, communication server 58 detects a need for data service on a selected data line 54. This need may be indicated by current voltages, electrical tones, data link frames, packets, or any other suitable analog or digital protocol or data sequencing. Controller 80 detects the need using link 82 and configures switch 70 to provide a coupling between the selected data line 54 and one of the output lines 72 coupled to a selected modem pool 74. The selected modem translates bidirectional communication between a communication protocol on output line 72 and a digital protocol on digital line 76. Multiplexer 78 translates information between digital lines 76 and one or more multiplexed digital lines 62.

Figure 3:
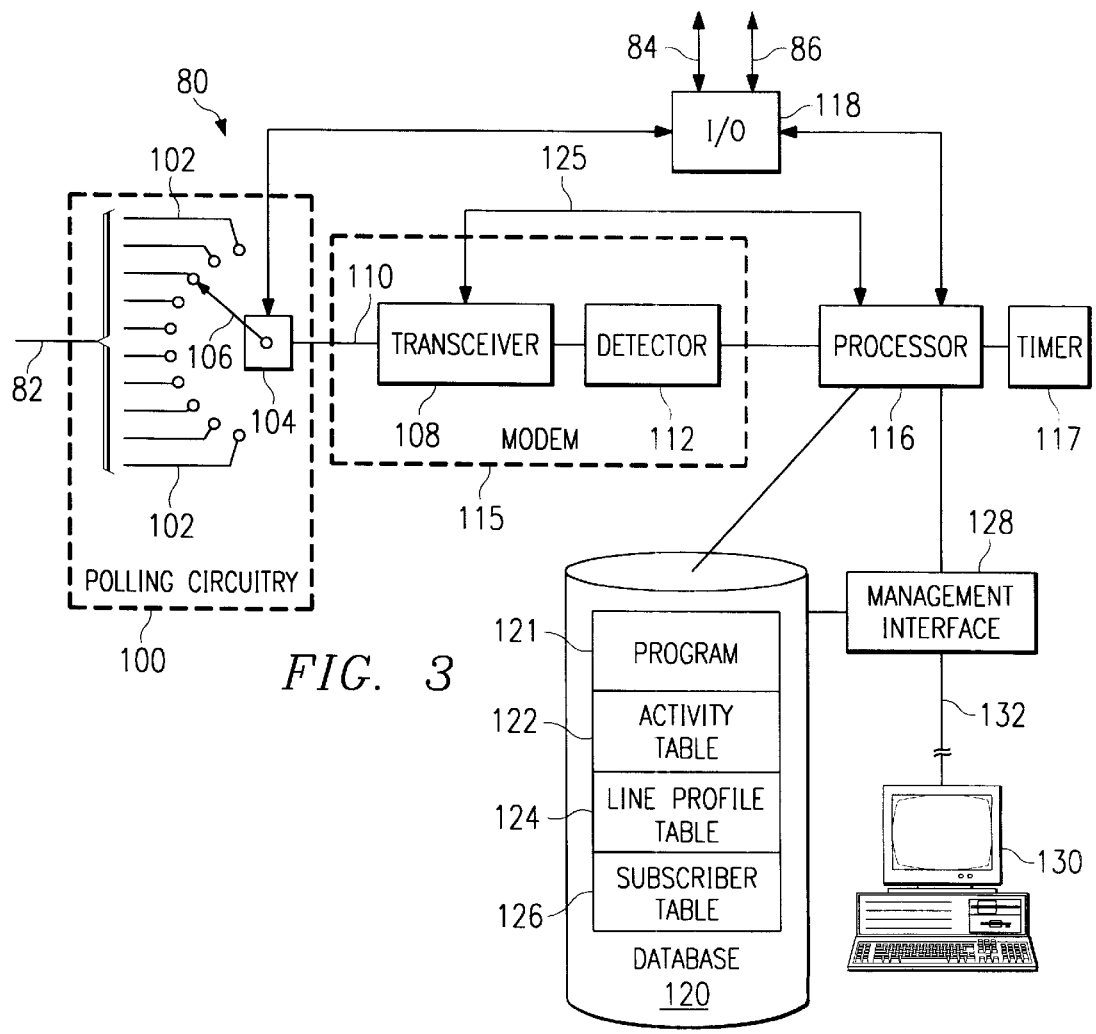
FIG. 3 illustrates in more detail the controller of the communication server.

FIG. 3 illustrates in more detail controller 80. Data lines 54 through link 82 are coupled to polling circuitry 100. In one embodiment, polling circuitry 100 includes a number of terminals 102 corresponding to each data line 54. A switch 104 having a conductive probe 106 contacts terminals 102 to sample the signal on the associated data line 54. Polling circuitry 100 may comprise electromagnetic components, such as a relay or switch, solid state circuitry, or both. It should be understood that the present invention embodies any polling circuitry 100 that allows sampling, in succession or simultaneously, one or more data lines 54.

Transceiver 108 receives a selected signal 110 from polling circuitry 100. A detector 112 is coupled to transceiver 108, which in turn is coupled to processor 116. Detector 112 may include a media access controller (MAC) and associated memory to detect and store frames or packets of an appropriate digital protocol. Detector 112 may also include less complicated circuitry to detect current voltages, electrical tones, data bit transmissions, or other analog or digital information generated by transceiver 108.

Transceiver 108 and detector 112 may collectively be represented as modem 115, as indicated by the dashed line. Modem 115 provides an interface between the XDSL communication protocol of communication system 10 and processor 116. Modem 115 also includes similar components and performs similar functions as modem 30 in computer 22 to enable modem 30 and modem 115 to exchange information using XDSL technology. Throughout this discussion, the term detector may refer to detector 112 or collectively modem 115.

A processor 116 is coupled to detector 112 and controls the overall operation of controller 80. A timer 117 is coupled to processor 116. Processor 116 is coupled to input/output circuitry 118, which in turn is coupled to switch 70 and modem pool 74 using links 84 and 86, respectively. Processor 116 is also coupled to switch 104 of polling circuitry 100 using input/output circuitry 118. In one embodiment, processor 116 controls the data line selection, dwell time, and other suitable parameters of polling circuitry 100.

Processor 116 is also coupled to database 120 that includes a program 121, an activity table 122, a line profile table 124, and a subscriber table 126. Database 120 stores information as one or more tables, files, or other data structure in volatile or non-volatile memory. All or a portion of database 120 may reside at controller 80, within communication server 58, within station 14, or at another location in communication system 10. For example, several communication servers 58 in one or more central offices or other devices of communication system 10 can access database 120 stored in a central location to provide more intelligent management and provisioning of XDSL data service in communication system 10. One or more stations 14 may be coupled together and the resources of their associated communication servers 58 shared using simple network management protocol (SNMP) techniques.

Program 121 contains instructions to be executed by processor 116 to perform the functions of controller 80. Program 121 may reside in database 120 as shown or may be integral to memory components in transceiver 108, detector 112, and/or processor 116. Program 121 may be written in machine code, pseudocode, or other appropriate programming language. Program 121 may include modifiable source code and other version control features that allow modification, debugging, and enhancement of the functionality of program 121.

Activity table 122, described in more detail below with reference to FIG. 7, maintains status information on data lines 54, switch 70, and output lines 72. In particular, activity table 122 contains information on inactive and active data lines 54, data lines 54 corresponding to current valid subscribers 16 of XDSL data service, and the mapping performed by switch 70 between data lines 54 and output lines 72. Moreover, activity table 122 includes information that specifies the inactivity of a modem in modem pool 74, the status of a data line 54 as dedicated, and any other suitable information that enables processor 116 to monitor and control the operation of switch 70 and modem pool 74.

Profile table 124 stores profile information on data lines 54. This profile information reflects electrical or physical characteristics of data line 54, its associated subscriber line 16 and data line 28, intervening components such as interface 24, splitter 25, splitter 50, and polling circuitry 100, as well as any other component or factor that effects the performance or electrical characteristics of signals received on data lines 54. Processor 116 may access profile table 124 and provide profile information to transceiver 108 using link 125. Alternatively, transceiver 108 may be a more robust and broadband device that does not need profile information from profile table 124. Processor 116 may also provide profile information to program XDSL modems in modem pool 74 once a coupling is made to a selected data line 54. The existence and complexity of profile information in profile table 124 depends on the requirements of transceiver 108 and XDSL modems in modem pool 74, as well as the complexity of signals that indicate a need for data service from subscriber 12.

Subscriber table 126 stores subscriber information indexed by one or more identifiers of subscriber 12, computer 22, modem 30, subscriber line 16, or other information that associates data line 54 with a particular subscriber 12. Subscriber table 126 includes subscriber connect times, session duration, session activity, session logs, billing data, subscriber account information, and any other suitable subscriber information. This information may be summarized and additional information included to generate billing and demographic data on subscribers 12 in communication system 10.

For example, subscriber table 126 may maintain summary statistics on the number of subscribers 12 served by communication server 58, the average connect time, load factors, time-of-day connection profiles, and other statistics to assess the communication facilities to be deployed at communication server 58, the over-subscription ratio that can be supported by communication system 10, and other provisioning and management issues. Furthermore, subscriber table 126 may combine subscriber information from one or more communication servers 58 in one or more stations 14 in communication system 10.

Management interface 128 is coupled to processor 116 and database 120 and allows external access to the functionality of processor 116. Management interface 128 is also coupled to database 120, which allows modification of program 121, as well as remote access and modification of information in activity table 122, profile table 124, and subscriber table 126. In one embodiment, the telephone service provider or other entity that operates station 14 or communication system 10 accesses management interface 128 to provide management and control over the operations of controller 80 and communication server 58. For example, the telephone service provider uses management interface 128 to access activity table 122 and/or subscriber table 126 to update the valid subscribers 12 that have access to communication server 58. A local or remote computer 130 is coupled to program interface 128 using an appropriate data link 132, such as a serial RS-232 link, to provide this management feature.

In operation, modem 30 in computer 22 indicates a need for data service, and communicates this need to an associated data line 54 using interface 24, data line 28, splitter 25, subscriber line 16, and splitter 50. In one embodiment, modem 30 transmits successive requests at a predetermined request interval. Processor 116 accesses activity table 122 to determine which data lines 54 to poll, depending on the active or inactive status of the data line 54, whether subscriber 12 corresponding to data line 54 is a current and valid subscriber, and other appropriate considerations. For example, activity table 122 may indicate valid and non-dedicated subscribers 12 to poll.

Polling circuitry 100 successively or simultaneously polls one or more selected data lines 54, as directed by processor 116, using link 82 to detect a need for data service. For each data line 54 polled, processor 116 may access profile table 124 in database 120 and provide associated profile information to transceiver 108 using link 125. Polling circuitry 100 dwells on each data line 54 for a predetermined polling interval to detect a need. In one embodiment, the polling interval is at least two times a request interval of modem 30.

Upon detecting the need for data service associated with a selected data line 54 from polling circuitry 100, transceiver 108 may translate the information from the selected XDSL communication protocol employed on subscriber line 16 into digital or analog data for detection by detector 112. A media access controller (MAC) in detector 112 may transform serial digital data from transceiver 108 into a parallel digital format. Detector 112 receives the information translated by transceiver 108, and stores this information in a suitable memory location for access by processor 116. Processor 116 periodically accesses detector 112 to determine if a need for data service has been detected.

Upon detecting a need for data service, processor 116 accesses database 120 to determine the availability and status of modems in modem pool 74. Processor 116 selects an available modem from modem pool 74. Processor 116 then directs switch 70 to make the appropriate coupling between selected data line 54 and output line 72 coupled to the selected modem. Upon establishing coupling between modem 30 in computer 22 at subscriber 12 and a selected modem in modem pool 74, controller 80 continues to monitor the remaining data lines 54 using polling circuitry 100.

Processor 116 can transmit status or connection information to modem 30 in computer 22 using transceiver 108. This may be performed before, during, or after coupling the selected modem in modem pool 74 to data line 54. For example, processor 116 may send acknowledgment information to modem 30 that includes an indication that a modem is or is not available, an identification of the available modem, a time interval before modem 30 should attempt communication with the selected modem in modem pool 74, or any other suitable information. Furthermore, processor 116 may access information from subscriber table 126, such as billing and account information, historical connection information, or other suitable subscriber information, and transmit this information separate to or as part of the acknowledgment information described above.

Processor 116 may also transmit connection information and updated billing and subscriber information to modem 30 at computer 22 using link 86 and the associated XDSL modem in modem pool 74. This information may include the length of the current session, the current balance in the account of subscriber 12, as well as any other suitable information that relates to the account or activity of subscriber 12 with communication server 54. Generally, processor 116 may communicate any suitable information stored at or made available to controller 80 to subscribers 12 using transceiver 108 or the associated modem in modem pool 74.

FIG. 4 illustrates in more detail switch 70 and modem pool 74 of communication server 58. Data lines 54 are coupled to switch 70, now shown in more detail as a cross-bar or cross-point matrix switch. In this particular embodiment, data lines 54 correspond to lines 150, and output lines 72 correspond to lines 152 in switch 70. The number of lines 150 (n) is greater than the number of lines 152 (m). This allows switch 70 to couple selected data lines 54 to a reduced number of output lines 72 to provide an over-subscription of XDSL data service in communication system 10. For example, switch 70 couples the second of lines 150 to the last of lines 152 by establishing connection 154. Similarly, switch 70 couples the last of lines 150 and the first of lines 152 by establishing connection 156.

Although switch 70 is shown in FIG. 4 to be a cross-bar or cross-point matrix switch, it should be understood that any device that can couple a number of data lines 54 to a reduced number of output lines 72 may be used. Switch 70 may incorporate electromagnetic components, such as relays and contacts, or may be implemented in whole or in part using one or more solid state devices.

Modem pool 74 includes XDSL modems 160 associated with output lines 72 from switch 70. Modems 160 translate information between an appropriate XDSL communication protocol on output lines 72 and an appropriate digital protocol on digital lines 76. In one embodiment, modems 160 may be similar in construction and operation to modem 30 at subscriber 12. A detector 162 coupled to modems 160 detects the activity of modems 160 to determine if the line has become inactive for a predetermined interval of time. For example, if one of the modems 160 does not display activity over a five-minute interval, detector 162 generates a timeout indication to notify processor 116 of the inactive modem. Processor 116 releases or decouples the inactive modem for later subscriber sessions. In one embodiment, detectors 162 may include one-shot timers or other retriggerable timers set for a predetermined time interval to detect the inactive status of modems 160.

Detector 162 is a monitoring circuit that passes through the digital output of modems 160 to digital lines 76 for presentation to multiplexer 78. Multiplexer 78 may combine signals from digital lines 76 into a single multiplexed digital line 62. Alternatively, multiplexer 78 may employ any suitable reduction ratio that places signals on digital lines 76 on a fewer number of multiplexed digital lines 62.

Processor 116 may directly communicate with modems 160 using link 164. For example, link 164 allows processor 116 to program modems 160 with profile information retrieved from profile table 124. Link 164 also supports communication between processor 116 and selected subscribers 12 during an active subscriber session using modems 160. Moreover, link 164 allows processor 116 to monitor the information received from and transmitted to subscribers 12 during a communication session.

In operation, switch 70 couples a selected subset of data lines 54 to output lines 72 in response to signals received from controller 80 using link 84. Each of the output lines 72 is coupled to an associated modem 160 which translates the information formatted in an analog communication protocol, such as XDSL, into an appropriate digital signal. The digital information output from modems 160 passes through detector 162, which monitors the activity on the output line of modems 160. If detector 162 senses inactivity over a predetermined interval, a timeout indication is provided to processor 116 using link 86. Signals on digital lines 76 may be reduced to fewer multiplexed digital lines 62 using multiplexer 78.

FIG. 5 illustrates in more detail transceiver 108 in controller 80. To receive information, transceiver 108 includes filters and magnetics 170 to condition the signal from selected data line 54. The conditioned signal is provided over differential lines 172 to analog bit pump 174. Bit pump 174 performs the specific demodulation technique for the chosen XDSL communication protocol. For example, bit pump 174 may execute a discrete multi-tone demodulation (DMT) or carrier less amplitude phase demodulation (CAP) to demodulate an XDSL signal on differential lines 172 into a digital stream on line 176. Logic and timing circuitry 178 contains decode logic, timing and synchronization circuitry, steering logic, and other appropriate digital processing circuitry to produce a data signal on receive data line 180 and a corresponding clock signal on clock line 182 for delivery to detector 112 or processor 116. Detector 112 may include a MAC to support any digital protocol or signal detection that indicates a need for XDSL data service. The data may be in non-return-to-zero format or any other suitable format.

To transmit information, transceiver 108 receives a data signal on transmit data line 184 from detector 112 or processor 116. Using the clock line 182, logic and timing circuitry 178 digitally processes signals received on transmit data line 184 for delivery to analog bit pump 174. Using an appropriate modulation technique, such as DMT or CAP, analog bit pump 174 produces an analog signal for delivery over differential lines 172 to filters and magnetics 170 for transmission over selected data line 54.

FIG. 6 illustrates in more detail a specific embodiment of detector 112 that includes a MAC 113 and a memory 114. MAC 113 is coupled to receive data line 180 and clock line 182, and translates received data from a serial data format, such as a non-return-to-zero format, into an appropriate parallel digital format. MAC 113 translates the data from the chosen digital protocol and provides the data to memory 114 using data bus 190. MAC 113 also provides an address to memory 114 using address bus 192 to specify the location in memory 114 to store data provided on data bus 190. In addition, MAC 113 provides a write signal to memory 114 using control line 194.

To transmit data, MAC 113 provides a read signal to memory 114 using control line 194, and an associated address of the data to be read using address bus 192. In response, memory 114 provides the requested data on data bus 190. MAC 113 translates the data into the selected digital protocol for placement on transmit data line 184.

FIG. 7 illustrates one embodiment of activity table 122 stored in database 120 of controller 80. Processor 116 accesses and modifies entries in activity table 122 to direct the operation of controller 80. In addition, management interface 128 provides external access to activity table 122. For example, a telephone service provider using management interface 128 can add, delete, or otherwise modify entries in activity table 122 to maintain a listing of valid subscribers 12. Database 120 stores some or all of the status information shown in this exemplary activity table 122, as well as other information that may be used by processor 116 to direct the activities of controller 80.

Activity table 122 includes a data line column 200 that contains an address or other appropriate identifier of data lines 54 associated with subscriber lines 16 and their related subscribers 12. Status column 202 indicates the status of data line 54 identified in data line column 200. For example, status column 202 may contain one or more indications that the associated data line 54 is inactive (I), active (A), or dedicated (D) . A timeout column 204 indicates whether detector 162 in modem pool 74 has detected a timeout associated with a particular data line 54. A modem column 206 includes an identifier of the modem 160 associated with the corresponding data line 54.

An entry in activity table 122 corresponds to a row that designates a selected data line 54 in data line column 200, the status of the selected data line 54 in status column 202, a timeout indication of the selected data line 54 in timeout column 204, and the modem associated with the selected data line 54 in modem column 206. For example, entry 208 relates to data line "D1" which is inactive. Entry 210 represents data line "D2" which is inactive but dedicated to modem "M1." Entry 212 indicates that data line "D4" is active, coupled to modem "M3," but a timeout indication has been detected.

Subscribers 12 indicated in status column 202 as dedicated may be serviced by communication server 58 in a specific way. Switch 70 in communication server 58 maintains a coupling between data line 54 corresponding to dedicated subscriber 12 and its associated and dedicated modem 160. In this manner, controller 80 need not detect a need for data service or reconfigure the couplings for data line 54 corresponding to dedicated subscriber 12. In this manner, communication server 58 provides the option of a different class of service for a dedicated subscriber 12 that desires uninterrupted access to XDSL communication facilities.

Figure 8:
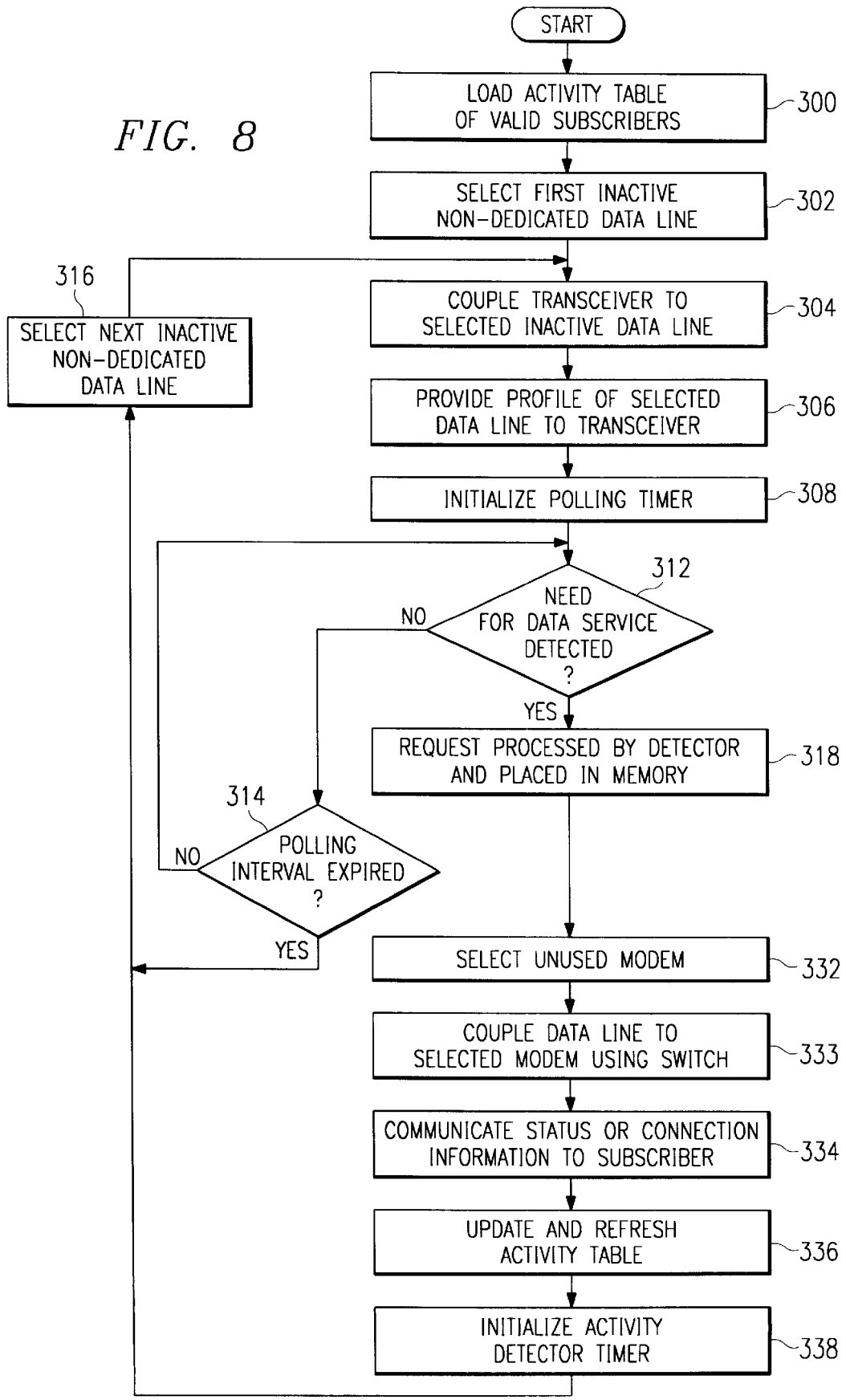
FIG. 8 is a flow chart of a method for coupling a data line to a modem in the communication server.

FIG. 8 is a flow chart of a method performed at controller 80 to couple data lines 54 to modems 160 in modem pool 74.

The method begins at step 300 where processor 116 of controller 80 loads activity table 122 from database 120 which contains an entry for each valid subscriber 12 served by communication server 58. Using management interface 128, a telephone service provider may ensure that activity table 122 reflects valid subscribers 12 by monitoring past due accounts, the overuse of data service, successive invalid attempts to access communication server 54, or other factors that may cause subscribers 12 to be invalid. Processor 116 selects the first inactive and non-dedicated data line 54 indicated by the designation "I" in status column 202 of activity table 122. Since switch 70 is configured to continuously couple dedicated subscribers 12 to their dedicated modems 160, processor 116 need not select an inactive data line 54 that is also dedicated, as indicated by the designation "I/D" in status column 202.

Using input/output circuitry 118, processor 116 directs switch 104 of polling circuitry 100 to couple transceiver 108 to the selected inactive and non-dedicated data line 54 at step 304. If appropriate, processor 116 accesses profile table 124 in database 120 and provides profile information for the selected data line 54 to transceiver 108 using link 125 at step 306. Processor 116 initializes timer 117 with a predetermined polling interval at step 308.

If a need for data service has not been detected by transceiver 108 at step 312, then processor 116 checks timer 117 at step 314. If the polling interval monitored by timer 117 has not expired at step 314, then processor 116 again determines if a need has been detected at step 312. However, if the polling interval monitored by timer 117 has expired at step 314, processor 116 selects the next inactive and non-dedicated data line 54 as indicated in status column 202 of activity table 122 at step 316, and returns to step 304.

If a need for data service is detected at step 312, the associated information may be further processed by detector 112 and placed in memory for access by processor 116 at step 318. Before, during, or after step 318, transceiver 108, detector 112, and/or processor 116 may validate the need for data service. Validation may be performed at a low level, such as a verification of the checksum or detection of an incomplete transmission, or at a higher level, such as a verification of an identifier, password, or other security information that provides access to communication server 58. Validation contemplates any level of validation or security handshake that confirms that the received need is valid and accepted by controller 80.

Upon selecting an unused modem at step 332, processor 116 generates a command that directs switch 70 to couple the selected data line 54 to the selected modem 160 at step 333. Processor 116 may communicate status or connection information to subscriber 12 using transceiver 108 or the selected modem 160 at step 334. Processor 116 updates activity table 122 at step 336 to indicate that the selected data line 54 is now active and that the selected modem 160 is now being used. Processor 116 directs activity detector 162 to initialize the inactivity interval for the selected modem 160 at step 338. Processor 116 then selects the next inactive and non-dedicated data line 54 in activity table 122 at step 316, and returns to step 304.

FIG. 9 is a flow chart of a method for monitoring and decoupling modems 160 due to inactivity. It should be understood that the methods described with reference to FIGS. 8 and 9 may be performed simultaneously or in alternative succession by processor 116 to couple and decouple data lines 54 with modems 160. The method begins at step 400 where processor 116 loads activity table 122 which contains an entry for each valid subscriber 12 served by communication server 58. Processor 116 selects a first active and non-dedicated data line 54 as indicated by the designation "A" in status column 202 of activity table 122 at step 402. Since switch 70 is configured to maintain a coupling between dedicated subscribers 12 and their dedicated modems 160, processor 116 need not select an active data line 54 that is also dedicated, as indicated by the designation "A/D" in status column 202.

Processor 116 retrieves timeout status for modem 160 associated with the selected active data line 54 from detector 162 using link 86 and input/output circuitry 118 at step 404. Processor 116 determines if a timeout has occurred for the selected active data line 54 at step 408. If a timeout has not occurred, processor 116 selects the next active and non-dedicated data line 54 as indicated in status column 202 of activity table 122 at step 410, and returns to step 404.

If a timeout has occurred at step 408, processor 116 may communicate status or connection information to subscriber 12 associated with the selected active data line 54 using transceiver 108 or the associated modem 160 at step 412. Processor 116 generates a command to direct switch 70 to decouple the active data line 54 from its associated modem 160 at step 414. Processor 116 updates activity table 122 at step 416 to indicate that data line 54 is now inactive and that the associated modem 160 is available for another subscriber session.

Figure 10A:
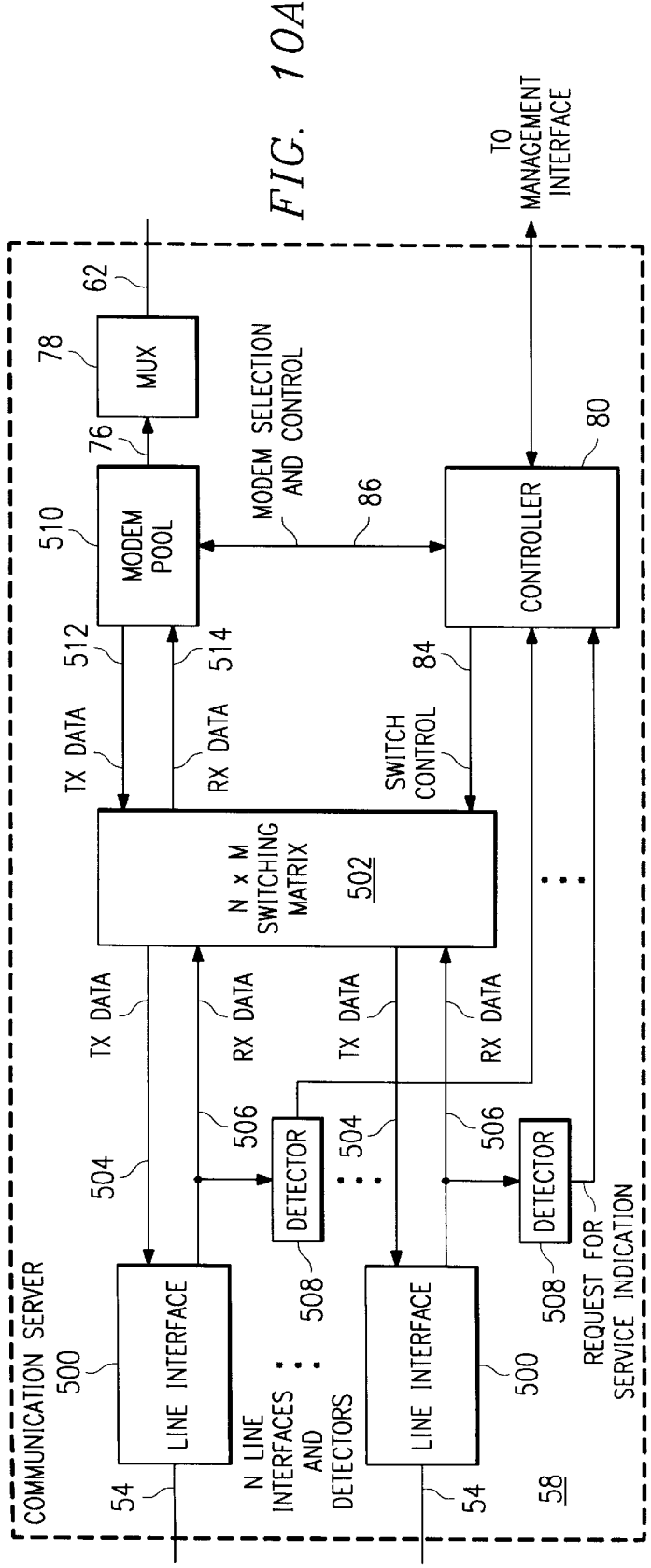
FIG. 10A illustrates another implementation of the communication server.

FIG. 10A illustrates another implementation of communication server 58 in communication system 10. Communication server 58 of FIG. 10A provides switching at an isolated four-wire interface. As shown in FIG. 10A, data lines 54 are coupled to and received by a plurality of line interface units 500. Each line interface 500 provides an analog interface, line driver and transformer for processing signals on data lines 54. Each line interface unit 500 is coupled to a switching matrix 502 and communicates with switching matrix 502 across a transmit data pair 504 and a receive data pair 506. Each line interface unit 500 operates to interface between transmit data pair 504 and receive data pair 505 and twisted pair data line 54.

In the implementation of FIG. 10A, a detector 508 is coupled to each receive data pair 506. Each detector 508 operates to detect a request for service on the associated receive data pair 506 and, upon detection, provides a signal to controller 80 indicating a request for service. Detector 508 is shown in more detail in FIG. 10D, and implementations of detectors are shown in more detail in FIGS. 11A, 11B and 11C. It should be understood that other implementations can combine polling with multiple detectors to reduce the number of inputs to controller 80 and to reduce the number of detectors. For example, FIG. 3 shows an implementation using polling circuitry 100 that can be used with the detector in the communication server embodiment of FIG. 10A.

As shown, switching matrix 502 is coupled to a modem pool 510 and communicates with modem pool 510 across transmit data pairs 512 and receive data pairs 514. Transmit data pairs 512 and receive data pairs 514 contain a number of pairs equal to the number of modems in modem pool 510. As described above, modems in modem pool 510 convert signals in an appropriate XDSL communication protocol into digital data in an appropriate digital protocol on digital lines 76. Multiplexer 78 is then coupled to digital line 76 and provides a multiplexed digital line output 62. Also as described above, controller 80 provides switch control signals 84 to switching matrix 502 and communicates modem selection and control information 86 with modem pool 510.

In operation, each detector 508 detects a request for service on the associated receive data pair 506 and informs controller 80 that a request for service has occurred. Controller 80 then checks which modems in model pool 510 are assigned and which data lines 54 are valid. Controller 80 assigns a modem from modem pool 510 to the requesting data line 54 using switching matrix 502 to connect the associated receive data pair 506 and transmit data pair 504 to the appropriate receive data pair 514 and transmit data pair 512.

A technical advantage of providing switching at a four-wire interface within communication server 58 is that switching matrix 502 is isolated from data lines 54 and subscriber lines 16 by transformers in line interface units 500. Because of this isolation, switching matrix 502 can operate without constraints imposed by technical requirements for interaction with data lines 54 and subscriber lines 16. For example, the isolation of switching matrix 502 allows CMOS switches to be used rather than more expensive solid state relays or mechanical relays.

Figure 10B:
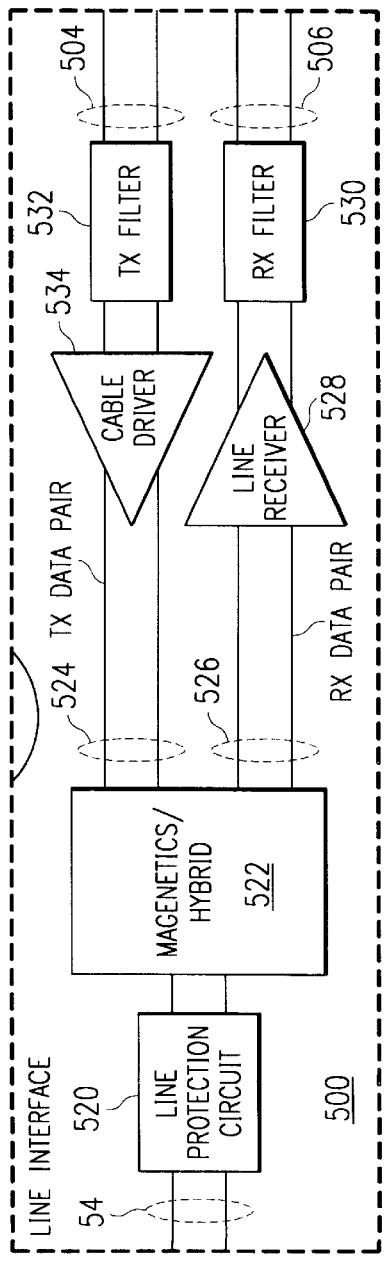
FIG. 10B illustrates in more detail a line interface device of the communication server of FIG. 10A.

FIG. 10B illustrates in more detail line interface device 500 of communication server 58 of FIG. 10A. Line interface device 500 includes a line protection circuit 520 that is coupled to and receives data line 54. Line protection circuit 54 operates to ensure that activity down stream in communication server 58 does not affect the integrity of data line 54. Line protection circuit 520 is coupled to a magnetics/hybrid unit 522. Magnetics/hybrid unit 522 can comprise a transformer and operates to interface between the data line and an internal transmit data pair 524 and receive data pair 526. Magnetics/hybrid unit 522 also isolates the four-wire interface provided by internal receive data pair 526 and transmit data pair 524 from data line 54.

A line receiver 528 receives receive data pair 526 and drives signals to a receive filter 530. The output of receive filter 530 is receive data pair 506 which is coupled to switching matrix 502 as shown in FIG. 10A. Similarly, transmit data pair 504 is coupled to a transmit filter 532 which provides signals to a cable driver 534. Cable driver 534 then drives signals on transmit data pair 524 to magnetics/hybrid unit 522.

Figure 10C:
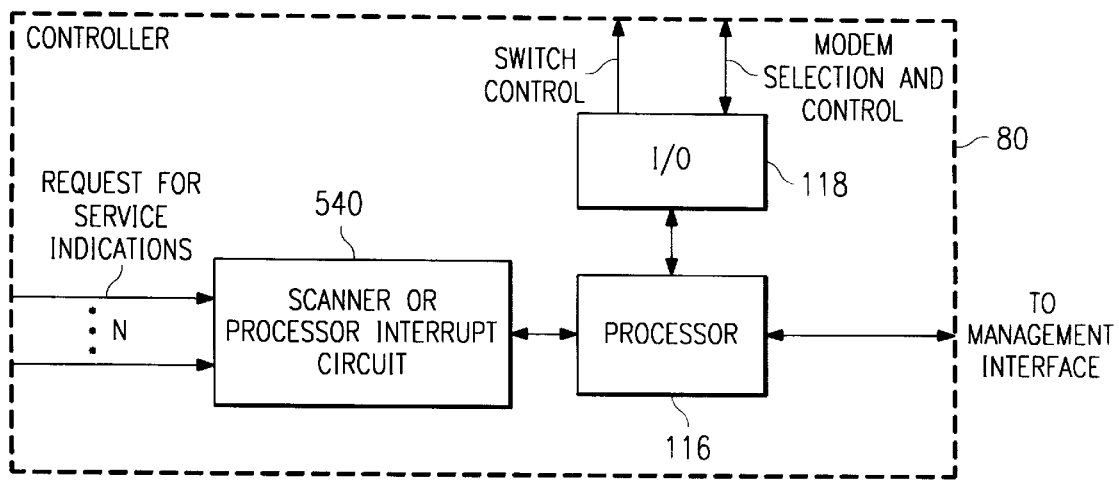
FIG. 10C illustrates in more detail the controller of the communication server of FIG. 10A.

FIG. 10C illustrates in more detail controller 80 of communication server 58 where a plurality of detectors provide indications of a request for service. Controller 80 of FIG. 10C includes processor 116 and input/output circuitry 118 as discussed above with respect to FIG. 3. Controller 80 also includes a scanner or processor interrupt circuit 540 which receives the request for service indications from detectors 508 and provides a scanner output or processor interrupt to processor 116. This allows the outputs of a number of detectors 508 to be sampled to provide an appropriate signal to processor 116 when a request for service has been detected. As mentioned above, it should be understood that selection of the number of detectors and the amount of polling can be made as appropriate for the desired application. In one implementation, scanner or processor interrupt circuit 540 comprises a gate array having logic circuitry for generating appropriate interrupt signals to processor 116.

Figure 10D:
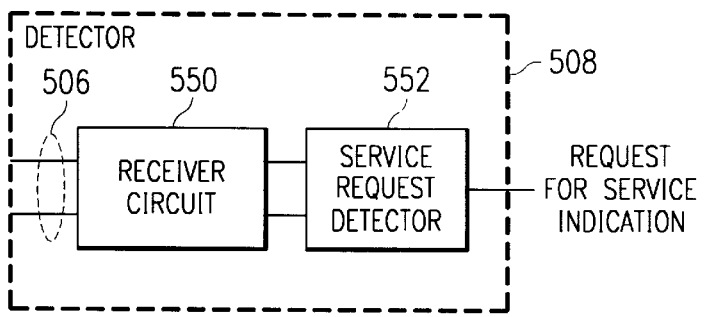
FIG. 10D illustrates in more detail a detector of the communication server of FIG. 10A.

FIG. 10D illustrates in more detail a detector 508 of communication server 58. As shown, detector 508 includes a receiver circuit 550 and a service request detector 552. Receiver circuit 550 is coupled to a receive data pair 506 and provides an output to service request detector 552. Service request detector 552 then operates to identify a request for service. Upon detection, service request detector 552 provides a signal indicating a request for service to controller 80. For ADSL systems (e.g., CAP and DMT), the request for service can be an initial tone that is a pure sinusoid or a modulated sinusoid. Three implementations of a detector 508 are illustrated in more detail in FIG. 11A, 11B and 11C and described below.

Figure 10E:
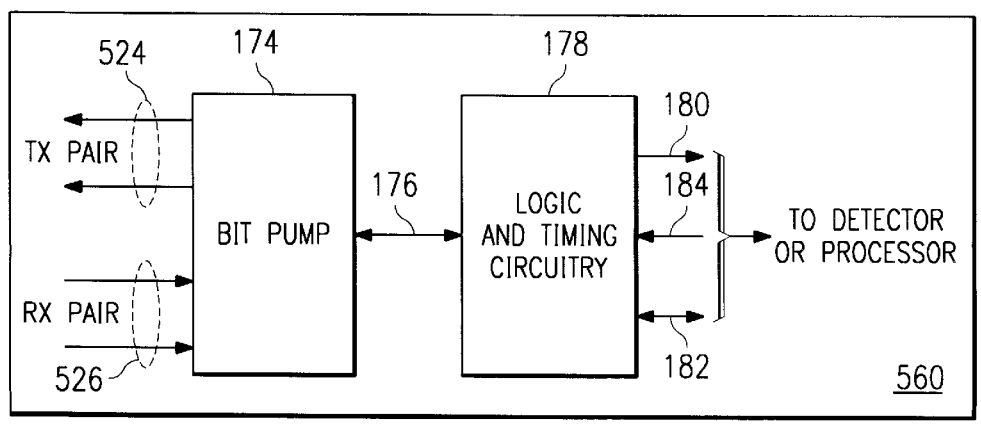
FIG. 10E illustrates in more detail a modem in the modem pool of the communication server of FIG. 10A.

FIG. 10E illustrates in more detail a modem 560 in modem pool 510 of communication server 58. Modem 560 is analogous to modem 108 of FIG. 5 with filters and magnetics 170 removed. Modem 560 includes a bit pump 174 which communicates with switching matrix 502 across receive data pair 526 and transmit data pair 524. Modem 560 does not need to include filters and magnetics 170 because of the functions provided by line interface units 500 to create the four-wire interface described above. Bit pump 174 and logic and timing circuitry 178 otherwise operate as discussed with respect to FIG. 5. Conceptually, the implementation of FIG. 10A moves the function of filters and magnetics 170 of modem 108 to line interface units 500 to isolate switching matrix 502 from data lines 54.

Figure 11A:
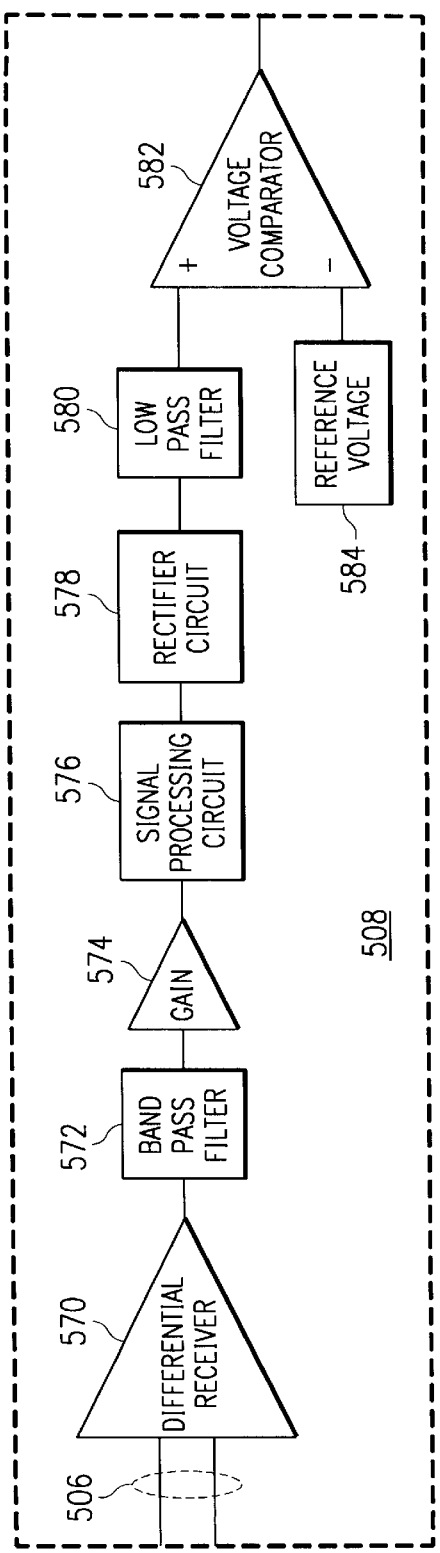
FIG. 11A illustrates in more detail an analog filter implementation of a detector of the communication server.

FIG. 11A illustrates in more detail an analog filter implementation of a detector 508 of communication server 58. Detector 508 of FIG. 11A detects the tone or modulated tone using an analog filter circuit tuned to the distinct frequency used to transmit a subscriber request for service. Detector 508 comprises a differential receiver 570 that is coupled to an associated receive data pair 506. Differential receiver 570 is coupled to and provides a signal to a band pass filter 572. Band pass filter 572 is coupled to a gain device 574 which is coupled to a signal processing circuit 576. The output of signal processing circuit 576 is coupled to a rectifier circuit 578 which is coupled to a low pass filter 580. The output of low pass filter 580 is then provided as one input to a voltage comparator 582. The other input to voltage comparator 582 is connected to a reference voltage 584.

In operation, detector 508 operates to detect a tone or modulated tone that indicates a request for service on receive data pair 506. Differential receiver 570 produces a voltage output which is filtered by band pass filter 572 and provided to gain device 574. Gain device 574 then amplifies the signal and provides it to signal processing circuit 576. The signal processing circuit 576 processes or demodulates the XDSL signals generated at the customer location that indicate a request for data service. Signal processing circuit 476 provides the signal to rectifier circuit 578 that outputs the signal to low pass filter 580. Low pass filter 580 filters low frequency noise to provide a DC voltage as an input to voltage comparator 582. Voltage comparator 582 compares that DC voltage with reference voltage 584 and outputs a logic high when the DC voltage is greater than reference voltage 584. Reference voltage 584 is set so that voltage comparator 582 signals a request for service only when the appropriate tone or modulated tone is present on receiver data pair 506.

Figure 11C:
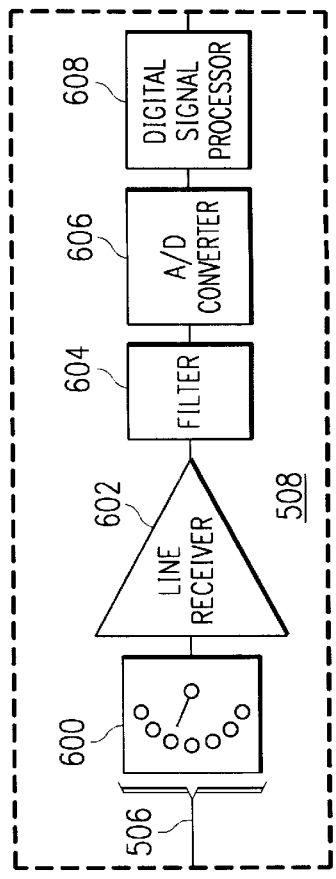
FIG. 11C illustrates in more detail a digital signal processor implementation of a detector of the communication server.
Figure 11B:
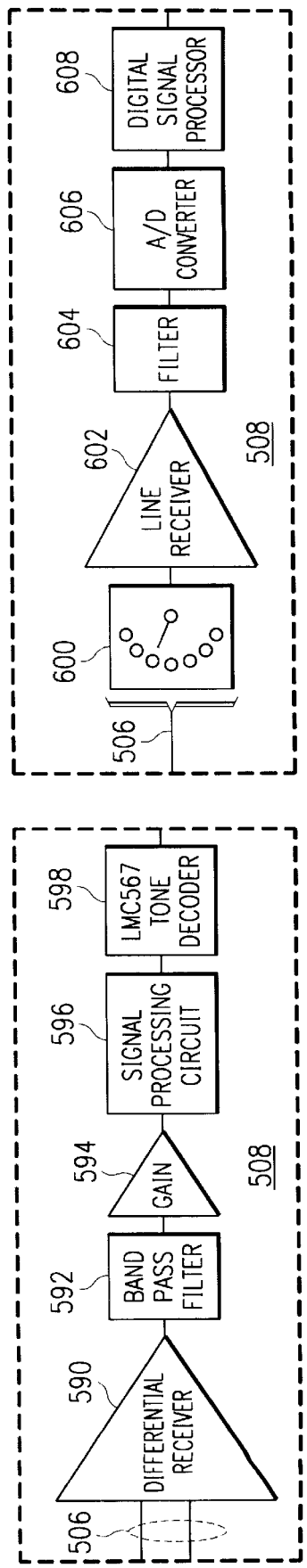
FIG. 11B illustrates in more detail a tone decoder implementation of a detector of the communication server.

It should be understood that detector 508 of FIG. 11A, as well as those of FIGS. 11B and 11C, can be connected to polling circuit 100 of FIG. 3 or other polling circuits to reduce the number of detectors required or to scan the outputs of the detectors. The number of lines that can be polled by a single polling circuit is generally limited by the amount of time that is required by the detector to reliably detect the subscriber request for service.

FIG. 11B illustrates in more detail a tone decoder implementation of detector 508 of communication server 58. Detector 508 comprises a differential receiver 590 that is coupled to receive data pair 506 and provides an output to a band pass filter 592. Band pass filter 592 is coupled to a gain device 594 which provides an output to a signal processing circuit 596. The signal processing circuit 576 processes or demodulates the XDSL signals generated at the customer location that indicate a request for data service. The output of signal processing device 596 is then coupled to a tone decoder circuit 598. Tone decoder integrated circuit 598 provides an output to controller 80 indicating a request for service upon detection.

In one implementation, tone decoder circuit 598 comprises an integrated circuit, and specifically is an LMC567 tone decoder available from NATIONAL SEMICONDUCTOR. In this implementation, tone decoder circuit 598 includes a phase locked loop detector for identifying the tone or modulated tone that indicates a request for service. The phased locked loop detects when the received tone or modulated tone matches the signaling frequency, and the tone detector circuit responds by signaling a request for service.

FIG. 11C illustrates in more detail a digital signal processor implementation of detector 508 of the communication server 58. Detector 508 of FIG. 11C comprises a polling circuit 600 that is coupled to a plurality of receive data pairs 506. Polling circuit selects each receive data pair 506 and connects it to a line receiver 602. Line receiver 602 is coupled to a filter 604 which is coupled to an analog/digital converter 606. Analog/digital converter converts the signal to a digital signal and provides an output to a digital signal processor 608. Upon detection, digital signal processor provides a request for service indication to controller 80.

In the implementation of FIG. 11C, polling circuitry 600 connects line receiver 602, filter 604, analog/digital converter 606 and digital signal processor 608 to each line in succession. Digital signal processor 608 reads the data from the analog/digital converter 606 and demodulates or detects the request for service. The dwell time for polling circuitry 600 can be set, for example, such that detector 508 can poll the lines in less than half the duration of the subscriber request for service tone or modulated tone. The number of lines that can be polled by a single digital signal processor 608 is then determined by the amount of time required for digital signal processor 608 to reliably perform the detection algorithm and the duration of the tone described above.

Digital signal processor 608 is programmable to detect the subscriber request for service tone or modulated tone using an appropriate tone detection algorithm or demodulation algorithm. One advantage provided by the detector implementation of FIG. 11C is this programmability of the algorithm within digital signal processor 608.

It should be understood that the tones used to indicate service in the above description of FIGS. 11A, 11B, and 11C, may be the tone used in standard non-switched applications of XDSL modems, or may be additional tones added specifically to facilitate detection in switching.

Figure 12:
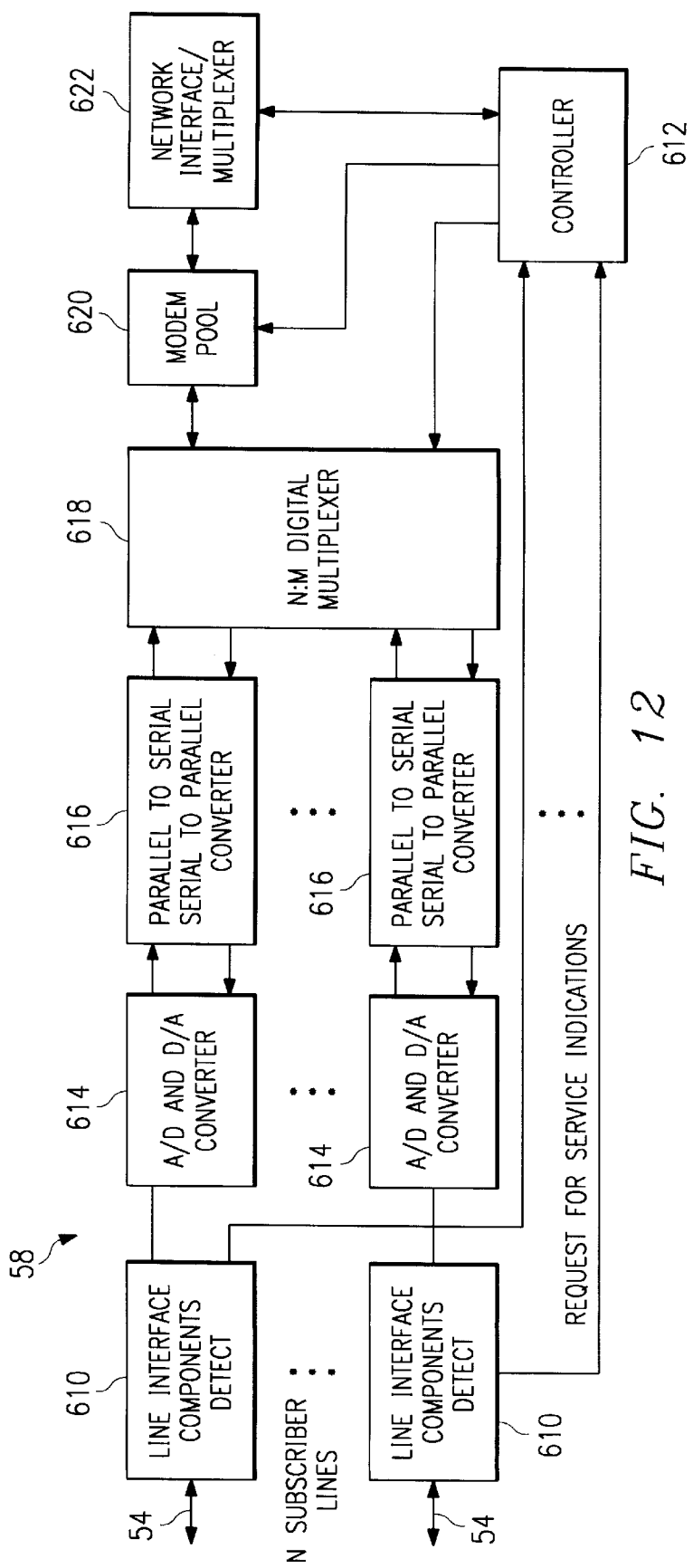
FIG. 12 illustrates in more detail a digital switching matrix implementation of the switch of the communication server.

FIG. 12 illustrates in more detail a digital switching matrix implementation of communication server 58. The implementation of FIG. 12 is appropriate for both a two-wire and four-wire interface to provide digital switching of the modem connections. Communication server 58 of FIG. 12 includes line interface components and data off-hook detection units 610 that interface with subscriber lines 54 and detect subscriber requests for service. Request for service indications are then provided to controller 612 for controlling the modem connections.

Each line interface and detection unit 610 is coupled to an associated analog/digital and digital/analog converter 614. Converters 614 are in turn connected to parallel/serial and serial/parallel converters 616. Converters 616 are coupled to a digital multiplexer 618 which operates under control of controller 612 to connect converters 616 to assigned modems in modem pool 620. Modems in modem pool 620 are coupled to a network interface/multiplexer 622 and can be implemented using digital signal processors. As shown, network interface/multiplexer 622 is coupled to and communicates with controller 612. This allows network interface/multiplexer 622 to know which modems and lines are active without having to monitor the communication traffic on the lines.

In operation, incoming communications are converted to digital words by converters 614 and then converted to serial bit streams by converters. The serial bit streams are connected to an assigned modem by digital multiplexer 618. The modems in modem pool 620 then communicate with network interface/multiplexer 622. For outgoing communications, the process is reversed. Serial bit streams from the modems are converted to parallel words and then to analog signals for transmission on data lines 54. This digital switching implementation of communication server 58 can be advantageous for switching of higher frequency XDSL communications.

Figure 13B:
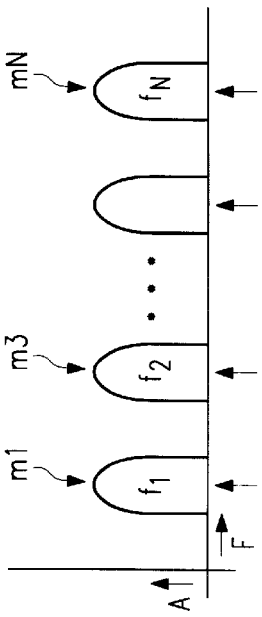
FIG. 13B is a diagram of frequencies used in the switch of FIG. 13A.
Figure 13A:
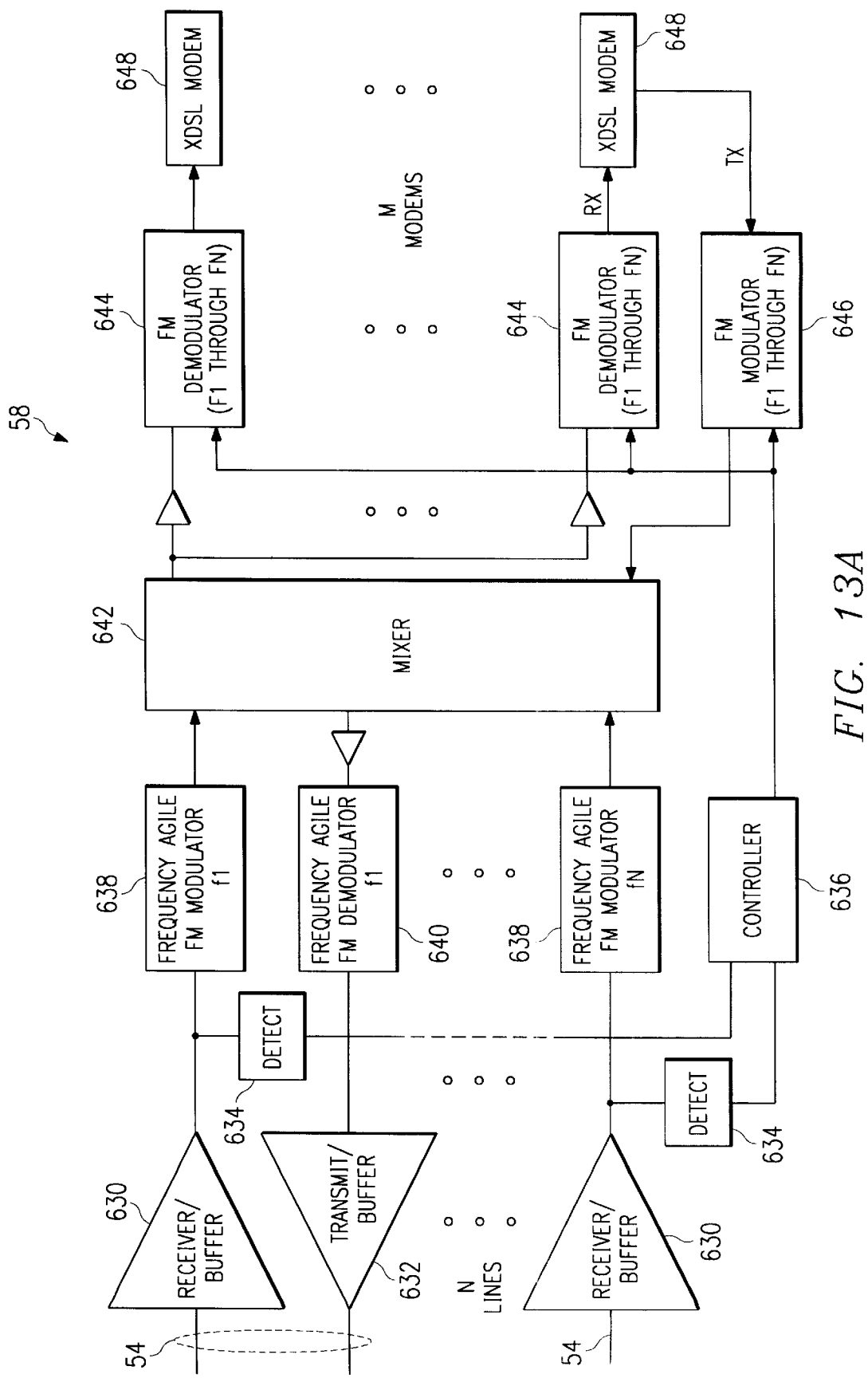
FIG. 13A illustrates in more detail a frequency multiplexing implementation of the switch of the communication server.

FIG. 13A illustrates in more detail a frequency multiplexing implementation for switching modem connections in communication server 58. This frequency multiplexing implementation could be appropriate for being located at a cable operator as well as a central office of a telephone network. As shown, data lines 54 are coupled to receiver/buffers 630 and transmit/buffers 632. Data off-hook detectors 634 are coupled to the output of receiver/buffers 630 and provide request for service indications to controller 636. For each data line 54, communication server 58 includes a frequency agile modulator 638 and a frequency agile demodulator 640. Each modulator 638 operates to modulate an incoming analog signal at a selectable frequency. In the illustrated embodiment, the frequency is set to one of a plurality of frequencies, f1 to fN, equal in number to the number of available modems. Similarly, each demodulator 640 operates to demodulate at a selectable frequency where the frequency is set to one of the plurality of frequencies, f1 to fN. Associated modulators 638 and demodulators 640 are set to operate at the same frequency.

Modulators 638 provide signals to and demodulators 640 receive signals from a mixer 642. Mixer 642 mixes the signals from modulators 638 and provides the combined signal to demodulators 644. Each demodulator 644 operates to demodulate the incoming signal at one of the frequencies, f1 to fN, as designated by controller 636. Each demodulator 644 is coupled to and provides the demodulated signal to an associated modem 648 in the modem pool. By designating the appropriate frequency, controller 636 effectively connects an assigned a modem 648 to a data line 54.

Outgoing signals are processed in an analogous manner. Each modem 648 provides outgoing analog signals to an associated modulator 646 designated to operate at the same frequency as the associated demodulator 644. Modulators 646 modulate the analog signal and provide the modulated signal to mixer 642. Mixer 642 combines the modulated signals and provides the combined signal to each demodulator 640. Demodulators 640 demodulate the combined signal to recover the appropriate analog signal at their selected frequency and provide the demodulated analog signal to transmit/buffers 632 for transmission. In this manner, modems 648 are connected to data lines 540 by modulating and demodulating signals at one of the frequencies, f1 to fN.

FIG. 13B is a diagram of frequencies, f1 to fN, used in the implementation of FIG. 13A. This results in each of the modems, m1 to mN, being assigned to one of the frequencies, f1 to fN, based upon the frequency for the connected data line 54, as shown. In order to connect a data line 54 to a assigned modem 648, modulators 644 and demodulators 646 are designated to operate at the frequency of the modulator 638 and demodulator 640 for that data line 54.

Figure 14A:
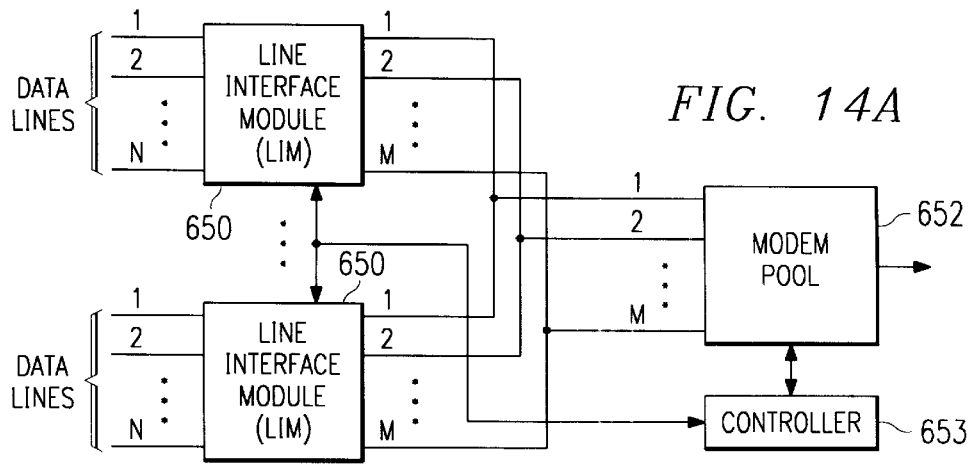
FIG. 14A illustrates line interface modules and the modem pool of a distributed switching implementation of the communication server.

FIG. 14A illustrates line interface modules (LIM) 650 and modem pool 652 of a distributed switching implementation of communication server 58. A controller 653 is coupled to line interface modules 650 and to modem pool 652. As shown, a plurality of line interface modules 650 are coupled to the data lines and to modem pool 652. Each line interface module 650 is operable to detect a request for service on the data lines and to connect each of the data lines it receives to each modem in modem pool 652. Controller 653 operates to select a modem from modem pool 652 in response to a detected request for service. Controller 653 then directs the appropriate line interface module 650 to connect the requesting data line to the selected modem. In the illustrated implementation, each line interface module 650 receives N data lines and includes switches to connect the N data lines to any of the M modems in modem pool 652. In this manner, the switching function is distributed across line interface modules 650 and is scalable as support for more data lines is added. In addition, although a two-wire interface is shown, the architecture of FIG. 14A can be used at a two-wire or four-wire interface.

Line interface modules 650 allow switching capabilities to be scalable with the desired number of modems and over-subscription. As an example, one implementation has four data lines connected to each line interface module 650 and thirty-two modems in modem pool 652. For a 10:1 over-subscription, this implementation would use 80 line interface modules 650 for connecting 320 data lines to the 32 modems in modem pool 652. In order to double the number of supported data lines, another 80 line interface modules 650 could be added along with another 32 modems. On the other hand, if a 5:1 over-subscription for 32 modems is desired, 40 line interface modules 650 would be used to service 160 data lines.

Figure 14B:
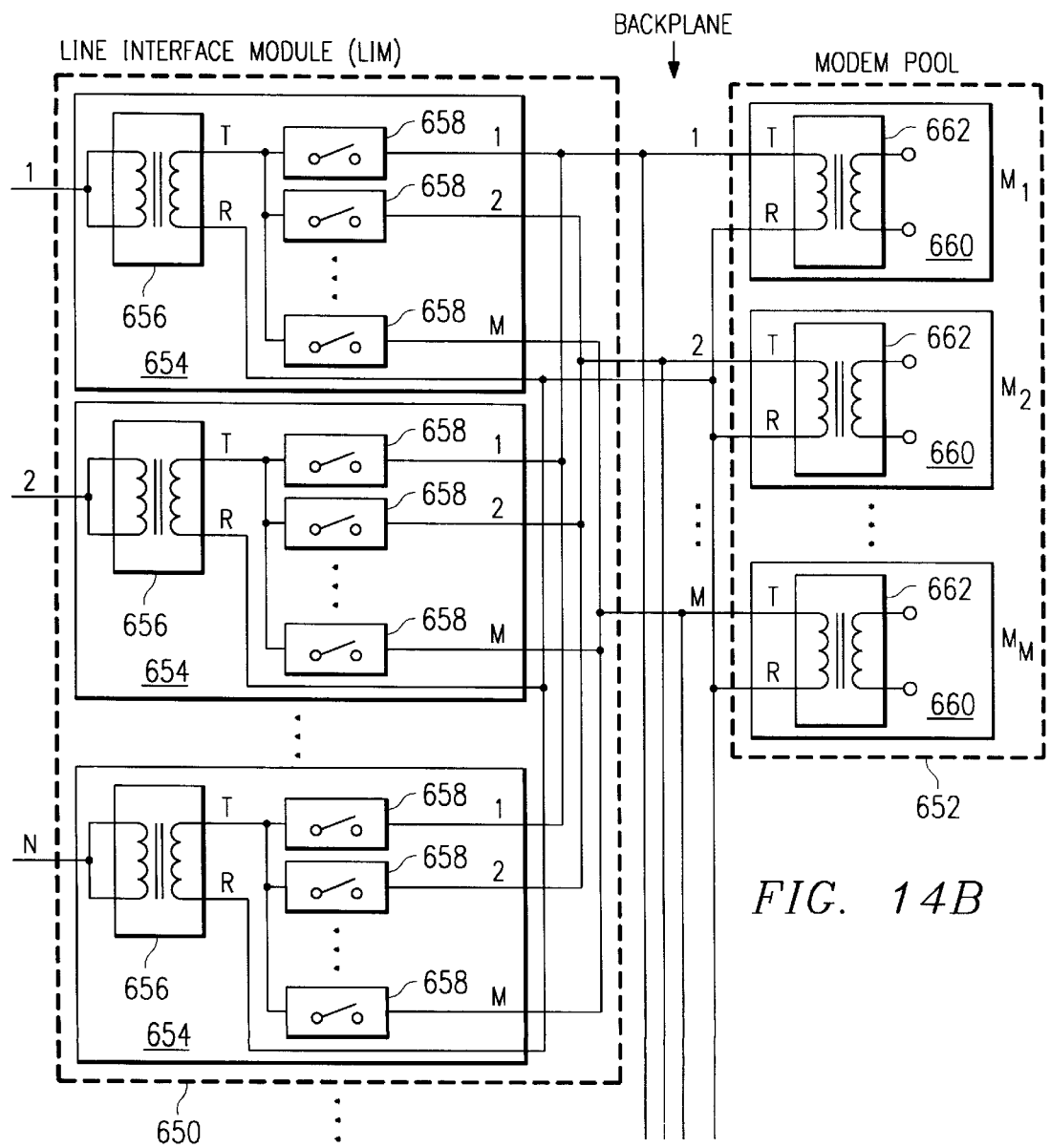
FIG. 14B illustrates in more detail the line interface modules and the modem pool of the communication server of FIG. 14A.

FIG. 14B illustrates in more detail line interface modules 650 and modems 660 in modem pool 652. As shown, each line interface module 650 includes a plurality of line interface units 654 that receive one of the N tip and ring data lines. Each line interface device 654 includes magnetics 656 and a plurality of switches 658. In the illustrated implementation, magnetics 656 includes a transformer that receives tip and ring lines of the associated data line. As shown in FIG. 14B, a T line is then provided to a plurality of switches 658 for connecting the T line to one of M outgoing lines. As shown, the M outgoing lines are equal in number to the number of modems 660 in modem pool 652. Then outputs of each line interface device 654 are connected together so that line interface module 650 has one output line for each modem 660 in modem pool 652 in addition to one output for the R lines. It should be understood that this can be implemented differentially using a pair of switches to switch the modem to the data line, rather than a single switch and a common R line, to enable switching R lines as well.

Modem pool 652 includes a plurality of modems 660 of which only the front-end portion are shown. Each modem 660 receives two lines from line interface modules 650 using magnetics 662. Because of magnetics 656 and magnetics 662, the switching and connections between line interface devices 654 and modems 660 are isolated from the data lines and from the back-end of modems 660. In one implementation, the connections between line interface modules 650 and modems 660 are accomplished on the back plane of a telecommunications chassis, and the line interface modules 650 and modems 660 are implemented as cards that plug into the back plane. In this implementation, a controller communicates with line interface modules 650 and modems 660 to control switching connections to modems 660.

In general, the communication server of the present invention detects a request for data transport service from a subscriber's XDSL modem, XDSL transceiver unit or other customer premises equipment as well as, for example, from a central office multiplexer. The detected request for service is then used to switch into connection an XDSL transceiver unit located at the central office, remote terminal or other local loop termination point providing, for example, a point of presence for an information service provider (ISP) or corporate network. The request-for-service detection mechanism allows a large pool of subscribers to be served by a smaller pool of XDSL transceiver units, thereby providing the basis for a cost-effective, massively deployable XDSL service. The request for service detection also makes fault tolerance possible since no subscriber is required to be dependent upon any specific XDSL transceiver unit in the pool.

Figure 15:
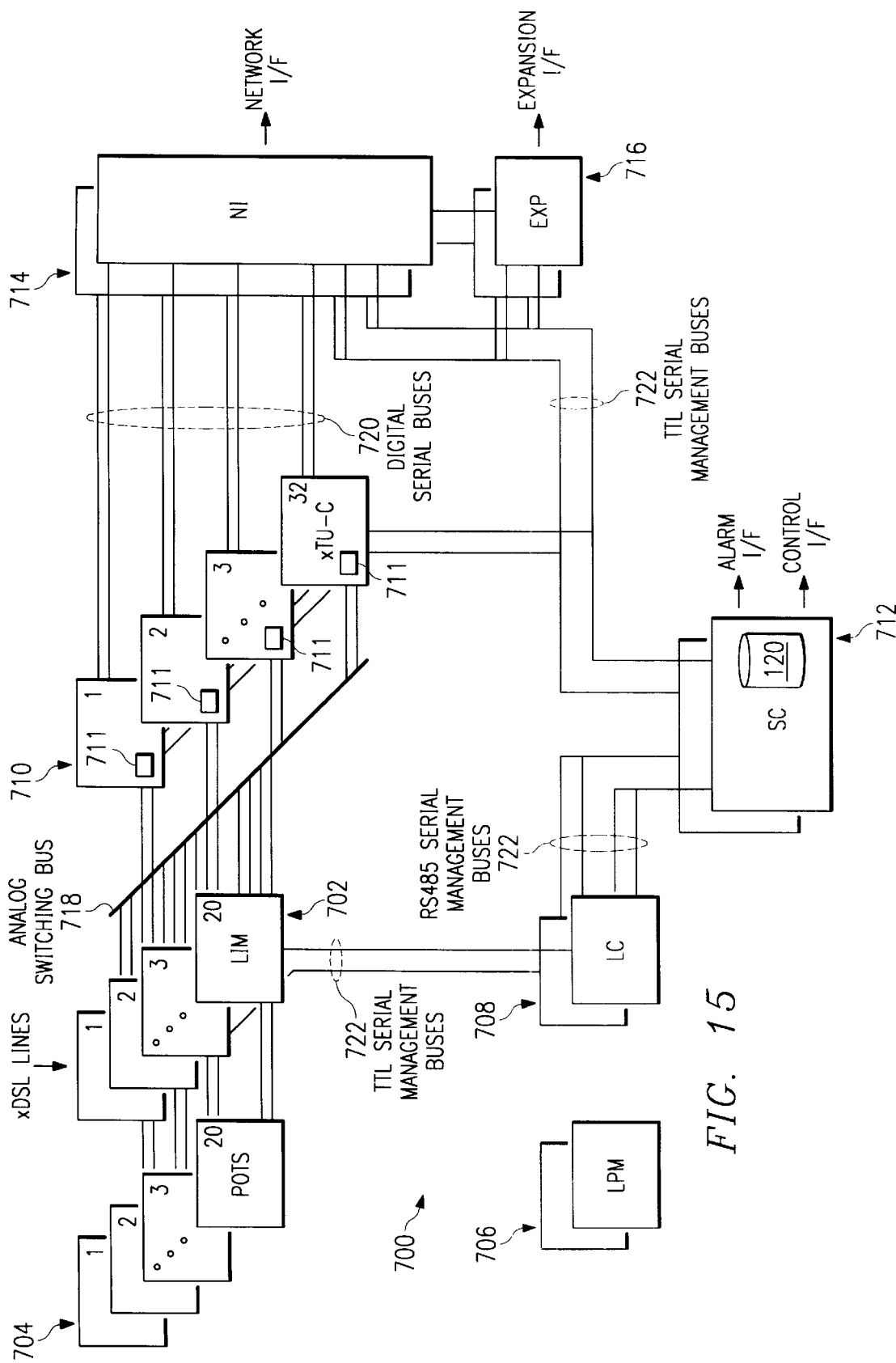
FIG. 15 illustrates a functional block diagram of one embodiment of a distributed switching implementation of the communication server.

FIG. 15 illustrates a functional block diagram of one embodiment of a distributed switching implementation of the communication server, indicated generally at 700. For clarity, one set of line interface modules 702 and POTS filter modules 704 are shown. Larger or smaller numbers of line interface modules and POTS filter modules can be used. In addition, POTS filter modules 704, which can provide the splitting function for voice and data traffic, are optional equipment and are not typically used when the communication server services terminated twisted pair data lines. Communication server 700 also includes line power modules (LPMs) 706 for powering line interface modules 702 and LIM control modules (LCs) 708 for controlling the line interface modules 702. Communication server 700 further includes XDSL transceiver units (xTU-C's) 710, system controllers (SCs) 712, and network interface modules (NIs) 714. In addition, communication server 700 can include expansion units 716.

A number of data buses within communication server 700 are shown in FIG. 15. Communication server 700 of FIG. 15 operates through the use of four major bus systems on a backplane of communication server 700: an analog switching bus 718, a digital serial bus 720, serial management buses 722, and a power bus (not shown in FIG. 15). Each of these buses can support redundancy and fault tolerance. In addition, an analog test bus (ATB) can be present for optional analog path testing, a protect bus can be present to allow 1:15 or 1:31 equipment protection for 1:1 deployments, and a busy bus can be used to distribute a busy indication to the line interface modules 702.

In one embodiment, the communication server consists of a multiplexer chassis, one or more optional POTS filter chassis, and one or more optional line interface module (LIM) chassis. In this embodiment, XDSL lines that carry a combined POTS/XDSL signal from the customer premises, can be terminated in a POTS filter shelf, which is a passive unit capable of accepting, for example, up to twenty POTS filter modules 704. These POTS filter modules 704 can contain lightning and power cross protection as well as passive filters which split out any analog POTS connections to the Public Switched Telephone Network (PSTN). Four lines, for example, can be terminated by each POTS module 704, giving the POTS filter shelf a maximum capacity, for example, of 80 subscriber terminations. As mentioned above, where the XDSL lines do not carry both POTS and XDSL signals, the POTS modules 704 are not used.

Wire pairs carrying XDSL service, whether originating from the subscriber or coming from-the POTS filter shelf, can then be connected to line interface modules 702. Line interface modules 702 can reside, for example, either in a multiplexer chassis or in a separate LIM chassis. The multiplexer chassis can be capable of supporting up to eight LIM chassis, for a maximum capacity of 640 subscriber lines, or 10:1 oversubscription. The LIM chassis can accept, for example, up to twenty line interface modules 702, with each module 702 terminating four subscriber lines, giving the LIM chassis a capacity of eighty subscribers (at 10:1 oversubscription). The line interface modules 702 can contain line isolation circuitry, digital service request detection circuitry, and an analog switching matrix which performs the concentration of lines to the pool of available XDSL transceiver units 710.

The XDSL signals from the line interface modules 702 can be connected to XDSL transceiver units via analog switching bus 718. The multiplexer chassis can support, for example, up to thirty two XDSL transceiver unit modules 710, with each module 710 containing two XDSL transceiver units, for a total of sixty four XDSL transceiver units. The XDSL transceiver units can be organized in two pools of thirty-two terminations each. Each transceiver can be connected to analog switching bus 718 carrying XDSL signals from the line interface modules 702. Each XDSL port on line interface modules 702 can be connected to one of the thirty two XDSL transceiver units in the assigned pool using a set of analog switches resident on the line interface modules 702.

System controller 712 maintains database 120 which stores program 121, activity table 122, profile table 124, and subscriber table 126. Profile table 124 is discussed in more detail below with reference to FIG. 19. All or selected portions of database 120 may be stored in one or more components internal or external to communication server 700. Each XDSL transceiver unit 710 includes registers 711 to store profile information retrieved from profile table 124 maintained at system controller 712. Registers 711 may be any form of registers, memory, or other storage devices or units that allow profile information to be maintained locally at XDSL transceiver unit 710 during an XDSL communication session. For example, registers 711 may be associated with one or more digital signal processors (DSPs) in XDSL transceiver unit 710. System controller 712 reads from and writes to registers 711 in XDSL transceiver unit 710 using serial management bus 722.

Two network interface (NI) modules 714 can be provided in the multiplexer chassis, allowing a redundant network interface to be installed if desired. The XDSL transceiver unit modules 710 can be connected to the network interface modules 714 via redundant digital serial point-to-point buses 720, carrying ATM cells on synchronous duplex lines. The network interface modules 714 can statistically multiplex cells to and from XDSL transceiver unit modules 710 in a cell switch architecture. The network interface modules 714 can also processes network signaling data.

Two slots can be provided for system controller (SC) modules 712. One system controller module 712 can be designated as the primary module, and the other system controller module 712 can be installed for redundancy. The System controller modules 712 can contain a processor which manages the multiplexer chassis and LIM chassis. Each line interface module 702 and XDSL transceiver unit module 710 can communicate with the System controller module 712 over dual redundant serial management buses 722 for configuration information and to report status. The System controller modules 712 also can provide, for example, both Ethernet and RS-232 management interfaces which can run either SNMP or TL1 protocols respectively. Further, the System controller modules 712 can contain power supply circuitry providing bus bias voltage as well as provide alarm contacts and alarm cut-off functions.

The multiplexer chassis can further contain two expansion unit (EX) slots. Expansion unit units 716 in those slots can be used for a variety of different functions. The expansion unit units 716 can have access to the network interface modules 714 through redundant high-speed serial buses. A separate line power module (LPM) 706 can be used to power line interface modules 702 when they are located in the multiplexer chassis. Line power modules 706 can be placed, for example, in any universal slot and can be redundantly deployed. Further, all modules in communication server 700 can be "hot" insertable. A separate bias supply, generated by the System controller modules 712 or LIM control modules 708, can be used to bias bus logic and allow hitless insertion of all modules in the system. Auto detection of newly inserted modules can then be supported by the System controller modules 712.

Analog switching bus 718 (ASB) is a shared switching bus to which all line interface modules 702 have access. Analog switching bus 718 can consist of individual two-wire connections from the line interface modules 702 to ports for the XDSL transceiver units on modules 710. The XDSL lines from the customer premises equipment (CPE) are connected to analog switching bus 718 using a matrix of analog switches on respective line interface modules 702. These switches allow each port of line interface modules 702 to be connected to, for example, any one of thirty-two two-wire connections to XDSL transceiver units on modules 710. Sixty four XDSL line terminations, for example, can be supported in the multiplexer chassis in the form of two pools of thirty-two terminations each. Analog switching bus 718 connections can be provided internally on the multiplexer chassis backplane for line interface modules 702 located in the multiplexer chassis. For the LIM chassis, analog switching bus 718 connections can be provided via cable assemblies from the LIM chassis to the multiplexer chassis. The analog switching bus 718 cables can be "daisy-chained" for multiple LIM chassis, as opposed to direct connections from each LIM chassis to the multiplexer chassis, to minimize connectors and cabling.

Digital serial bus 720 provides a path from XDSL transceiver units on modules 710 to network interface modules 714. Each XDSL transceiver unit port can drive two serial data and transmit/receive clock buses towards network interface modules 714, one bus for each network interface module 714, for redundancy. Each network interface module 714 can also drive two serial data buses towards the XDSL transceiver unit ports, and each XDSL transceiver unit can be programmed for which bus to receive by system controller 712.

Serial management bus (SMB) 722 can consist of two buses. Each redundant system controller 712 can drive and operate one of buses 722. The serial management bus 722 can be used to manage all modules on the multiplexer chassis and LIM chassis backplanes. The bus electrical format can be TTL on the multiplexer chassis backplane and LIM chassis backplane and can be multipoint RS485 from system controllers 712 to LIM controller modules 708 via external cabling. The serial management bus 722 can be an asynchronous bus and can carry a heartbeat message sent on the serial management bus 722 by the system controller modules 712. The other modules can be programmed to automatically switch to the alternate serial management bus 722 if the heartbeat signal is not received. Two control signals issued by the system controller module 712 can be used to determine whether the primary or secondary serial management bus 722 should be used.

XDSL transceiver unit modules 710 provide local loop termination for XDSL service. Each module 710 can support, for example, two XDSL connections to line interface modules 702. In this case, each module 710 can include two XDSL transceiver subsystems, two sets of digital serial data bus interfaces which connect to the network interface modules 714, and a microcontroller and serial management bus interface for configuration and control. The digital serial buses 720 between each XDSL transceiver unit module 710 and the redundant network interface modules 714 can carry demodulated data to the network interface modules 714 and digital data from the network interface modules 714 to be modulated. Data can be, for example, in the form of ATM cells or HDLC-framed packets, and the serial bus can consist of transmit and receive clock and data pairs to each network interface module 714. Each XDSL transceiver unit port on the modules 710 can be programmed by the system controller module 712 for which network interface bus to receive (i.e. which network interface module 714 is active). The microcontroller on the XDSL transceiver unit module 710 can be used to manage communications with the system controller module 712 and to control the XDSL terminations. Rate adaptive decisions, provisioning, performance monitoring, and other control functions can be performed by the microcontroller.

In the illustrated embodiment, system control module 712 is responsible for overall control of the communication server and for gathering of status information. Two system controller modules 712 can be provided for redundancy. In a redundant configuration, the two system controller modules 712 communicate with each other over a dedicated communications bus for sharing database information, self-checking, and on-line/offline control. Data requiring persistent storage, such as provisioning, performance statistics and billing information, can be stored on the system controller module 712 in non-volatile memory. Performance monitoring information can be collected for the network interface modules 714 and for each XDSL line, including information from remote customer premises equipment units.

Network interface modules 714 provide a high-speed connection for aggregated data traffic from the XDSL transceiver units. The network interface modules 714 connect to the XDSL transceiver unit modules 710 via point-to-point serial data buses 720. A high-speed serial interface to subtend host modules (SHMs) can also be provided. In one embodiment, two types of network interface modules 714 are supported: DS3/OC-3 ATM and DS1 ATM. A DS1 Frame Relay interface may also be provided. An OC3/DS3 ATM network interface can support ATM cell traffic at the XDSL transceiver unit interface, and either a 155 Mbit single-mode optical ATM User-Network Interface or a DS3 75 ohm coaxial interface on the network side. A DS1 ATM network interface can support ATM cell traffic at the XDSL transceiver unit interface, and a 1.544 Mbps DS1 ATM user-network interface on the network side. A DS1 Frame Relay network interface can support a 1.544 Mbit unchannelized DS1 Frame Relay port.

The subtend host module (SHM) is an expansion unit 716 that allows ATM data from multiple multiplexer chassis to be aggregated before being presented to the switched data network, using a technique called subtending. This technique provides full utilization of the ATM switch ports in the network. The subtend host module can contains six DS1 interfaces, and can be used to subtend one to six remote communication servers. The subtend interface can essentially be six DS1 UNI interfaces containing ATM cells, from the remote communication server. DS1 is terminated by the subtend host module and remote cells are sent to the network interface over individual and aggregate 10 Mbit serial connection. Each subtend host module has a serial interface to both network interface modules 714, providing full redundancy. Cell delineation is performed on the network interface 714, and cells are forwarded to the switching matrix in the same manner as cells from the XDSL transceiver unit interfaces.

Line interface module 702 can contain, for example, intra-office line protection/termination, XDSL start tone detection, test bus access, busy bus access, and switching for four XDSL connections. Line interface modules 702 can be located either in the multiplexer chassis for smaller system configurations, or in an LIM chassis for large configurations. A pair of lines from the POTS filter chassis can be routed to each line interface module 702 through the backplane for each interface. The shared analog switching bus 718 between the line interface modules 702 and the XDSL modem pool carries the switched signal from each active line to an XDSL transceiver unit. Service request detection circuitry detects the presence of start tones generated by the customer premises equipment (CPE) and signals the LIM controller 708 or system controller 712 through the serial management bus 722.

Figure 16:
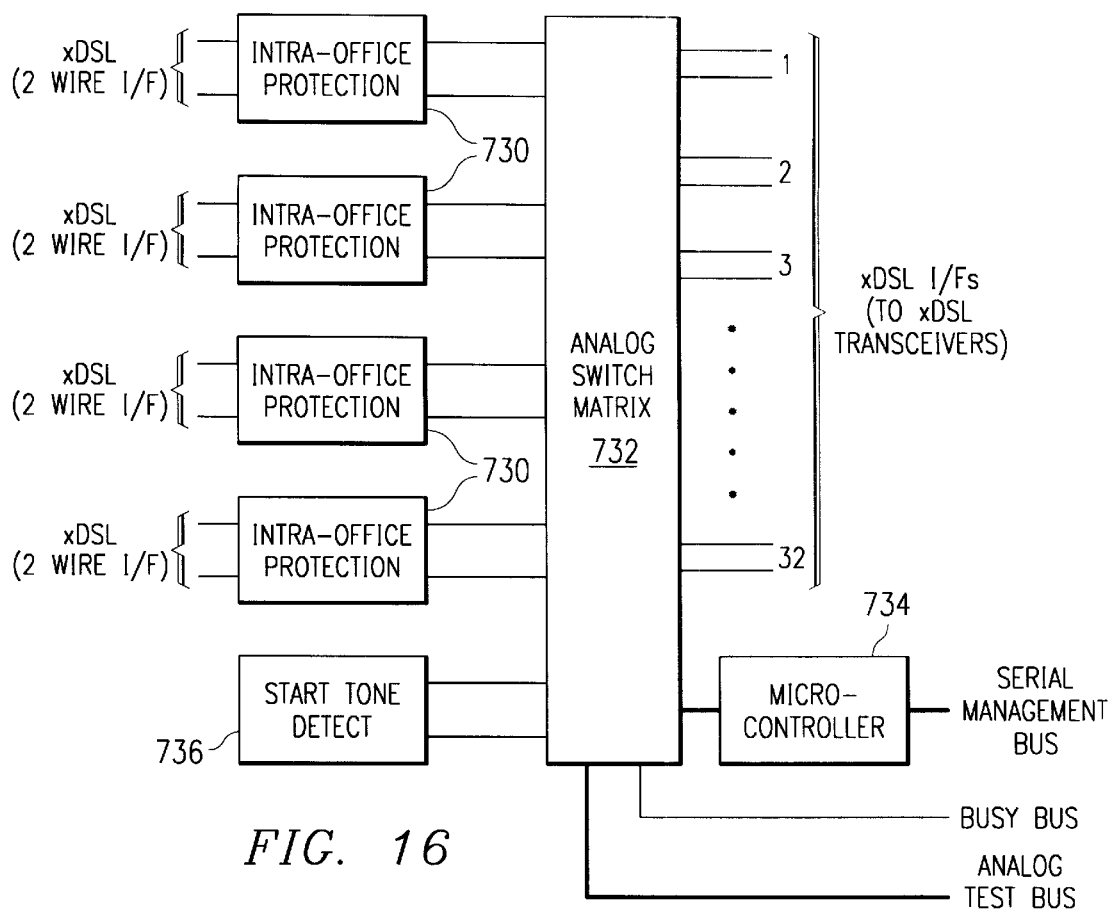
FIG. 16 illustrates a block diagram of one embodiment of a line interface module of FIG. 15.

FIG. 16 illustrates a block diagram of one embodiment of line interface module 702 of FIG. 15. As shown, line interface module 702 includes a plurality of intra-office protection circuits 730 that receive a two-wire interface for XDSL communications. Intra-office protection circuits 730 are coupled to an analog switch matrix 732. Analog switch matrix 732 connects selected intra-office protection circuits 730 to XDSL transceiver units. In the illustrated embodiment, analog switch matrix 732 connects each of four intra-office protection circuits 730 to one of thirty-two XDSL transceiver units. Line interface module 702 further includes a microcontroller 734 and a start tone detect circuit 736. In this embodiment, analog switch matrix 732 is used to connect each intra-office protection circuit 730 to start tone detect circuit 736 in succession to identify a request for service.

The LIM control modules (LCMs) 708 are responsible for receiving service request detect information from the line interface modules 702, configuring the analog switching matrix 732 under control of the system controller module 712, generating a busy signal for all line interface modules 702 in the chassis, and providing power for the line interface modules 702. One LIM control module 708 can be designated as a primary and another as a redundant back-up. For connection initiation, the LIM control module 708 can poll the line interface modules 702 to identify any pending service request detection events. The LIM control module 708 can then notify the system controller module 712, which in turn selects an available XDSL transceiver unit. The system controller module 712 then instructs the line interface module 702 to configure the analog switching matrix 732 to connect the requesting port to the selected XDSL transceiver unit. Connection termination notification is provided by the XDSL transceiver unit module 710 to the system controller module 712 upon detecting loss of carrier at the XDSL facility. The system controller module 712 then signals the LIM control module 708 to disconnect the line interface module 702 from the XDSL transceiver unit by clearing the switching matrix connection. Power for the line interface modules 702 can also be provided by the LIM control module 708.

Figure 17:
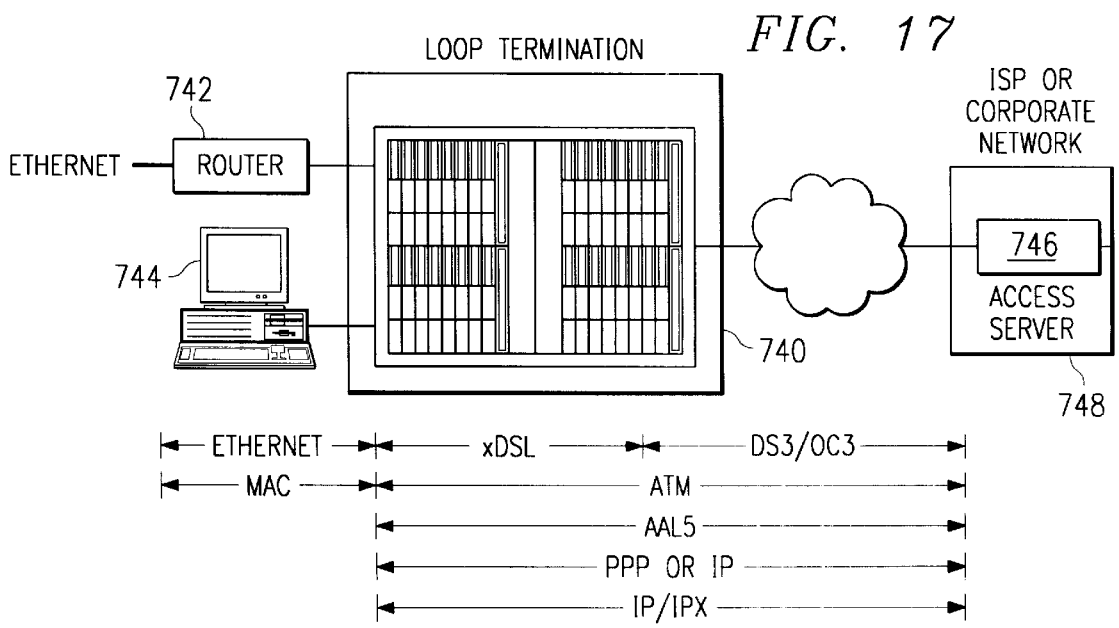
FIG. 17 illustrates one embodiment of ATM based transport communication protocols supported on the local loop and the network interface of the communication server.

FIG. 17 illustrates one embodiment of ATM based transport communication protocols supported on the local loop and the network interface of the communication server. Loop protocols refers to the data encapsulation protocols which reside on the local loop interface. It should be recognized that standards bodies are currently formulating a strategy on local loop protocols and the communication server is intended to support various protocol models with minimal hardware impact. PPP over ATM is one implementation for the disclosed communication server architecture. As shown in FIG. 17, the hardware can consist of a communication server 740 that interconnects a network router 742 and computing devices 744 with an access server 746 for an Internet service provider (ISP) or corporate network 748.

In this implementation, supported protocols are carried over ATM cells. The communication server 740 then becomes an ATM multiplexer switching ATM cells from the low speed XDSL ports to the high speed network interface port. The communication server 740 network interface can perform this switching independently of the underlying adaptation protocol. All cells can be indiscriminately switched. Specific support for ML1, ML3/4, ML5, OAM, and raw cell formats also can be incorporated into the network interface switching element. RFC1577 compatible IP over ML is a protocol that can be supported over the ATM layer of the XDSL loop. Point to point PVC or SVC connections can be established between the router 742 or device 744 at the customer premise and the access server 746 at the home network. PPP can be used to encapsulate IP, IPX, or Ethernet frames over ATM from the customer premises equipment across the XDSL link to the communication server 740. PPP over ML5 can be encapsulated using RFC1483 guidelines. SNAP/LLC headers can be used to distinguish PPP traffic from other possible traffic types.

The use of PPP allows many protocol encapsulations, including IP and IPX, and bridging using RFC1638. PPP can be carried through the ATM network to the access server 746 located at the corporate or ISP gateway. Authentication can then be performed between the customer premises and the service network using PPP authentication services such as the Password Authentication Protocol (PAP) and the Challenge Handshake Authentication Protocol (CHAP). In this scenario, PPP packets from remote users are transported to the ISP or corporate network 748 for authentication, thus freeing a network provider from authenticating each user to various network destinations. PPP also has the advantage of being relatively protocol independent and may be the wrapper for many networking protocols. In addition, Ethernet bridging may be supported through the use of ATM Forum LAN Emulation (LANE). LANE allows the bridging of multiple remote users to the home LAN over ATM.

Figure 18A:
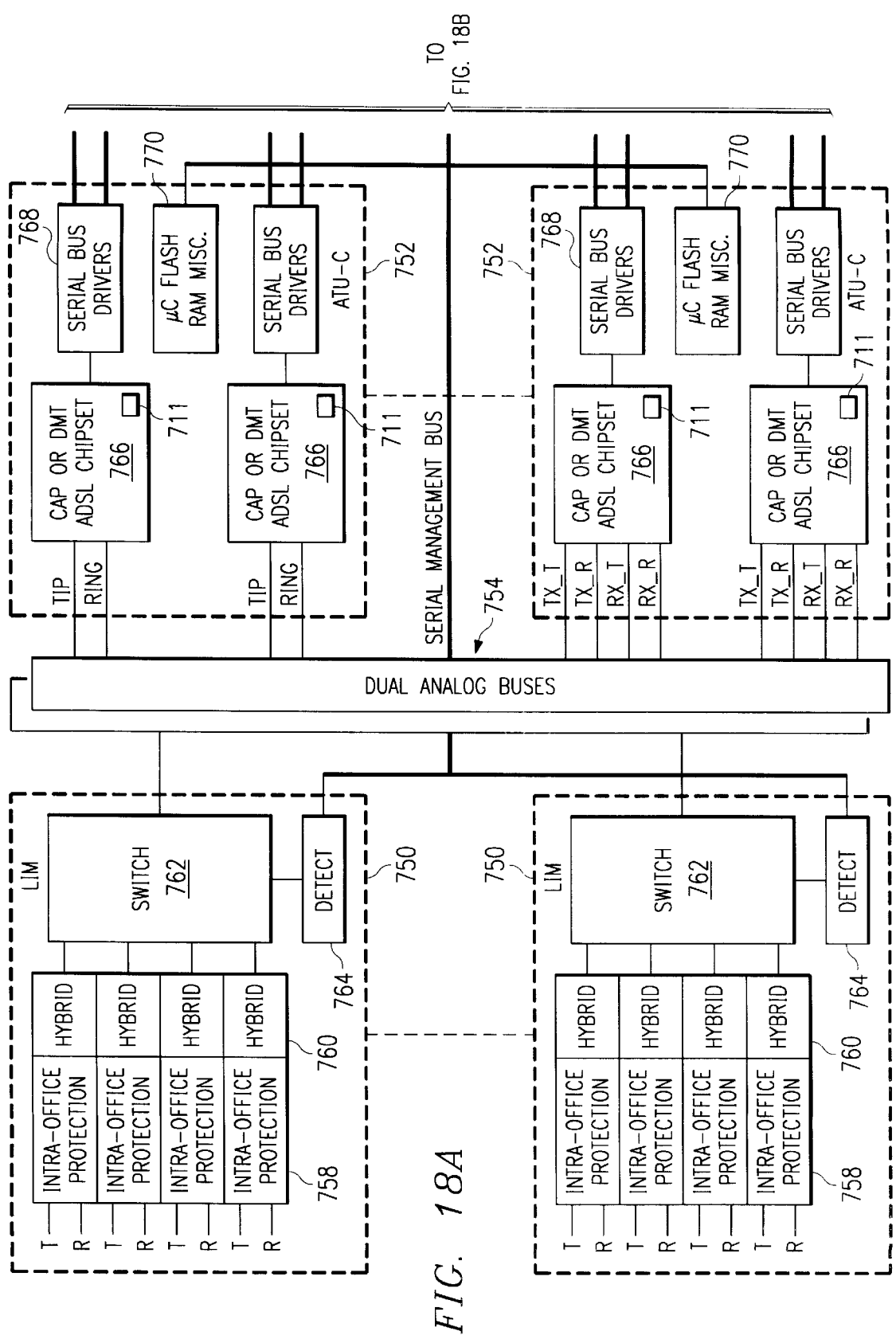
FIGS. 18A and 18B illustrate a system block diagram for one embodiment of the communication server.
Figure 18B:
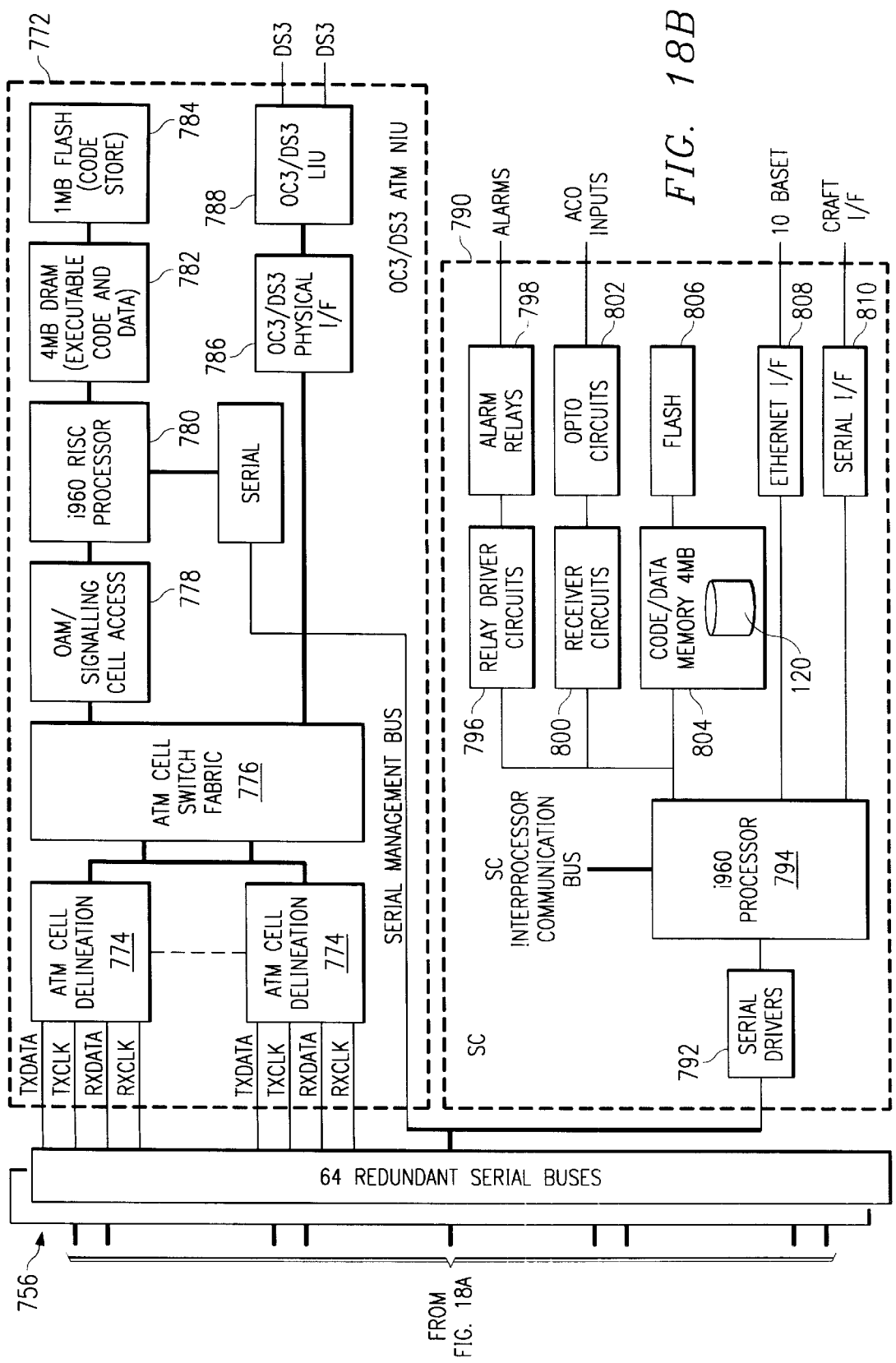

FIGS. 18A and 18B illustrate a system block diagram for one embodiment of the communication server. As shown, the communication server of FIGS. 18A and 18B includes a plurality of line interface modules (LIMs) 750 and a plurality of ADSL transceiver units 752 interconnected by dual analog buses 754. ADSL transceiver units 752 are connected to serial buses 756. Each line interface module 750 includes intra-office protection circuits 758, hybrid circuits 760, switch 762 and detect circuit 764. Each ADSL transceiver unit 752 includes an ADSL chipset 766 (e.g., CAP, DMT) for each transceiver channel, serial bus drivers 768 and other devices 770 (microcontroller, flash RAM). Chipset 766 is shown to include registers 711, but registers 711 may be in any other appropriate location within transceiver unit 752. Chipset 766 may include a number of digital signal processors, logic devices, memory devices, and other circuitry to perform any suitable form of XDSL modulation. In a particular embodiment, registers 711 are associated with at least one digital signal processor in chipset 766. These registers 711 may receive profile information (e.g., filter coefficients, equalizer tap coefficients, sub-band weights, margin) to train the line and engage in XDSL communication without a protracted training period.

Redundant OC3/DS3 ATM network interface units 772 are connected to ADSL transceiver units 752 by serial buses 756. Each network interface unit 772 includes a plurality of ATM cell delineation circuits 774 connected to ATM cell switch fabric 776. The switch fabric 776 is controlled by OAM/signaling cell access unit 778 and processor 780. A DRAM 782 and a flash memory 784 provide memory space for processor 780. A physical interface 786 and a line interface unit 788 are connected to switch fabric 776 and provide the physical DS3 connection.

Redundant system controllers 790 each include serial drivers 792 connected to a processor 794. Relay driver circuits 796 are connected to processor 794 and to alarm relays 798. Receiver circuits 800 also are connected to processor 794 and are connected to OPTO circuits 802. Memory 804 and flash memory 806 provide memory space for processor 794. For example, memory 804 may store database 120 which includes program 121, activity table 122, profile table 124, and subscriber table 126. Profile table 124 is discussed in more detail below with reference to FIG. 19. Processor 794 is further connected to Ethernet interface 808 and to serial interface 810. System controller 790, network interface 772, ADSL transceiver units 752, and line interface modules 750 operate generally as described above to accomplish the functions of the communication server.

FIG. 19 illustrates in more detail an exemplary embodiment of profile table 124, which generally includes subscriber information 820 and a variety of profile information 824. Subscriber information 820 may include a subscriber line 826, a subscriber ID 828, and a circuit ID 830 that alone or in combination identify a particular subscriber and/or line serviced by communication server 58. In a particular embodiment, subscriber line 826 denotes the chassis, module, and port associated with components in communication server 700. Subscriber ID 828 may be a telephone number, network address, or other identifier maintained by the telephone company or other entity to identify a subscriber. Circuit ID 830 includes a similar address or identifier used by the telephone company or other entity to specify the physical line serviced by communication server 58. Subscriber information 820 may also include a logical modem pool 832. Logical modem pool 832 specifies any arrangement or combination of XDSL modems or transceiver units to accomplish any desirable ratio of oversubscription or dedicated service to subscribers in communication system 10.

Profile information 824 contemplates a variety of digital signal processor (DSP) filter coefficients, parameters, configuration, and line training parameters used by XDSL modems or transceiver units to establish an XDSL communication session. Generally, profile information 824 illustrated in FIG. 19 includes maximum rates 834, margins 836, and a variety of coefficients/parameters 838. Maximum rates 834 specify both upstream and downstream maximum baud rates for the identified line. Maximum rates 834 may be based on the tariffed rate for the subscriber, physical limitations on the line, or other factors. For example, the line identified by subscriber line 826 with a chassis/module/port designation of "1.15.3" maintains a maximum upstream rate of one megabit per second (1 Mbps) and a maximum downstream rate of 4 Mbps based, for example, on a particular class of service for the subscriber. Alternatively, the line identified by subscriber ID 828 of "214-555-1212" has a maximum upstream rate of 2 Mbps and a maximum downstream of 8 Mbps, based on, for example, the maximum rate obtainable by the hardware and software in communication system 10.

Margin 836 represents the difference between a current or expected signal strength and a minimum signal strength to maintain communication at the specified maximum rate 834 over the designated line. In a particular embodiment, margin 836 is the difference between the achievable or current signal-to-noise ratio and the minimum signal-to-noise ratio to maintain communication for a given bit error rate (BER) such as 10E−7. Margin 836 may be expressed in dB and generally represents the quality of data communication on the line at maximum rates 834.

Coefficients/parameters 838 comprise digital filter coefficients, equalizer tap coefficients, sub-band weights, quadrature amplitude modulation(QAM) constellation configuration, bit capacity, or other coefficients and/or parameters that reflect physical and/or electrical characteristics of the line. Profile table 124 maintains coefficients/parameters 838 for each band (e.g., upstream, downstream, sub-band) for each line at one or more selected rates.

In a particular embodiment, each XDSL transceiver unit 710 includes one or more chipsets 766 that each have registers 711 for receiving profile information 824 in preparation for XDSL communication on a specified line. Registers 711 may be associated with digital filters implemented by DSPs in chipset 766. Using CAP, DMT, or other appropriate modulation technique, profile information 824 provided to registers 711 characterizes or fashions chipset 766 for communication over a particular line.

The maintenance of profile information 824 in profile table 124 provides a particular advantage in training lines and quickly establishing XDSL sessions in communication system 10. Each line served by communication server 58 includes a number of physical parameters, such as length, gauge, bridge taps, or other impairments or characteristics that govern the transmission of electric signals along the line. In addition, adjacent wires may contribute to interference on the line. Many of these characteristics and parameters are static as the physical structure of the line remains unchanged. The present invention takes advantage of this by initially training the line to generate profile information 824 for storage in profile table 124. Communication server 58 then retrieves stored profile information 824 for a selected line and provides this information to XDSL transceiver unit 710 coupled to the selected line in preparation for XDSL communication. The use of stored profile information 824 significantly decreases the amount of time needed to establish XDSL communication, and may substantially reduce or eliminate any need for retraining the line. By storing and selectively loading profile information 824 in XDSL transceiver unit 710, the present invention eliminates or hastens convergence of various adaptive elements (e.g., equalizers, filters) to improve access and performance.

Figure 20:
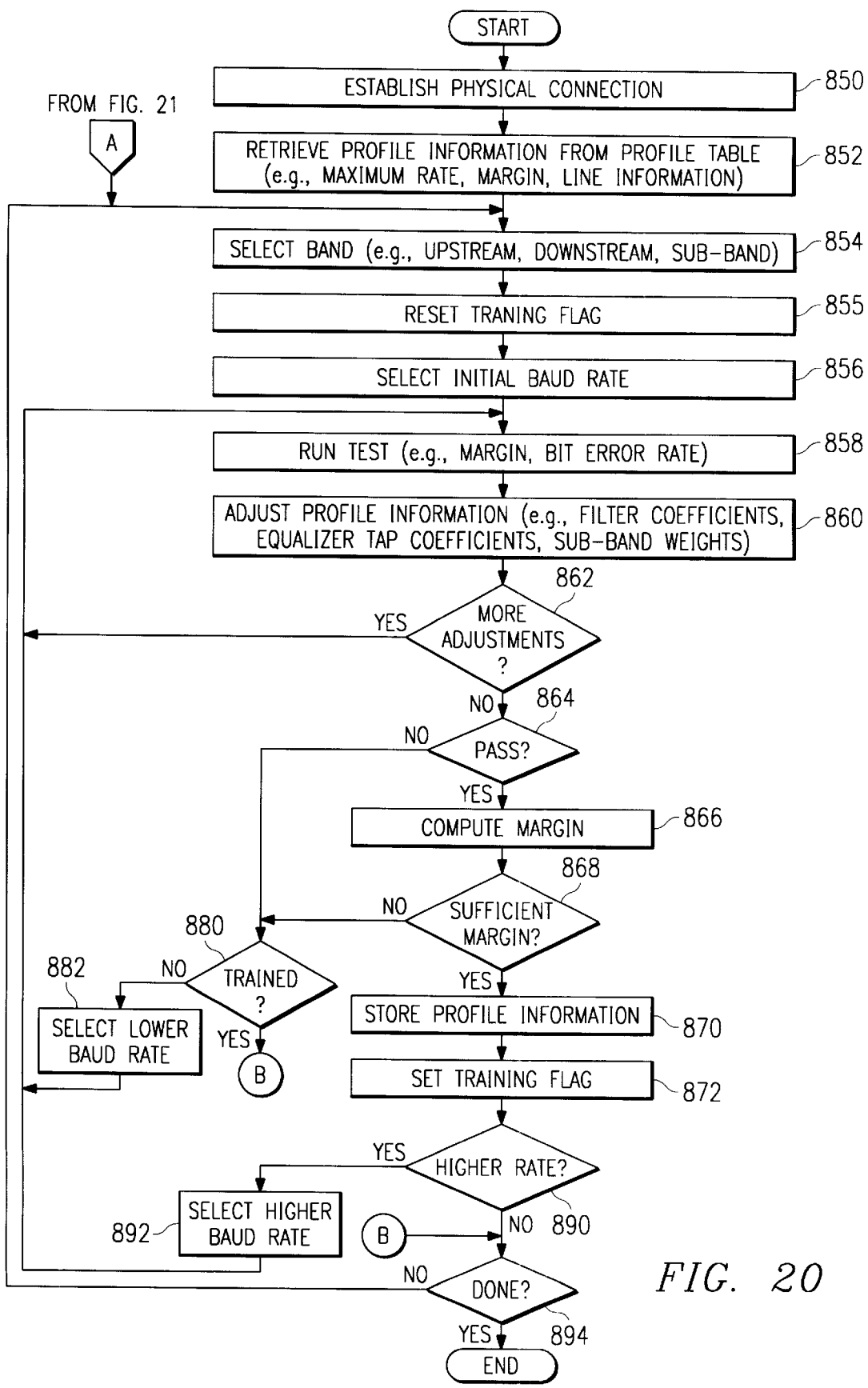
FIG. 20 is a flowchart of a method for training a line.

FIG. 20 is a flowchart of a method for training a line to generate or modify profile information 824. Although this method is described generally with reference to the architecture illustrated in FIG. 15, this method applies to any architecture or operation of communication system 10. Moreover, this method applies to any XDSL transceiver device located at a central office, remote terminal, point of presence of a service provider, customer premises, or other location that is coupled to a line that can be trained.

The method begins at step 850 where transceiver unit 710 establishes a physical connection with an associated line over analog switching bus 718. This may be performed using LIMs 702 and optionally POTS filter modules 704. Transceiver unit 710 retrieves profile information 824 from profile table 124 associated with the line at step 852. This may be performed by microcontroller 770 in transceiver unit 710 receiving profile information 824 from system controller 712 using serial management bus 722. System controller 712 accesses the proper profile information 824 using subscriber information 820.

Transceiver unit 710 selects a band for training, which could include the upstream, downstream, or sub-band supported by the particular modulation technique used in communication system 10. For example, using CAP modulation, transceiver unit 710 may select an upstream or a downstream band to train. Using DMT modulation, transceiver unit 710 may select a discrete sub-band used by the DMT modulation technique. Alternatively, transceiver unit 710 may train two or more bands simultaneously. After selecting a band at step 854, the method resets a training flag at step 855 to indicate that the selected band of the selected line has not been trained.

To begin a training session, transceiver unit 710 selects an initial baud rate at step 856, which may be included in or derived from profile information 824 retrieved at step 852 (e.g., maximum rates 834) or generated locally by transceiver unit 710. Transceiver unit 710 then runs a test to determine the quality or characteristics of the line at step 858. This test may be a measure of signal strength and/or noise to determine a line margin, a bit error rate (BER) test, or any other measurement or method to determine the quality or characteristics of the line. In a particular embodiment, a BER test sends and receives known information on the line using chipset 766. Transceiver unit 710 adjusts profile information 824 in response to the test at step 860 to improve signal quality. For example, transceiver unit 710 may adjust filter coefficients, equalizer tap coefficients, sub-band weights, QAM constellation configurations, bit rate, or any other coefficient or parameter that enables chipset 766 to communicate data more effectively over the line. If more adjustments need to be made as determined at step 862, transceiver unit 710 continues to run tests (step 858) and adjust profile information 824 (step 860) until achieving satisfactory performance from chipset 766. In particular, transceiver unit 710 may make adjustments until it achieves a bit error rate of less than a particular threshold, such as 10E−7.

After making adjustments, transceiver unit 710 determines if it passed the training session at step 864. Again, this pass/fail determination may be based on the computed bit error rate being above or below a pre-defined threshold. Upon passing, transceiver unit 710 computes margin 836 at step 866. Margin 836 may be expressed in dB and represents the difference between a current or expected signal strength and a minimum signal strength to maintain communication at the selected baud rate (step 856) in one or more selected bands (step 854). If transceiver unit 710 determines that margin 836 is sufficient at step 868, then system controller 712 stores profile information 824 in profile table 124 of database 120 at step 870. The method sets the training flag at step 872 to indicate successful training of one or more selected bands of the line.

If transceiver unit 710 does not pass the training session (step 864) or does not achieve sufficient margin 836 (step 868), then transceiver unit 710 determines if it has previously trained successfully at this band by checking the status of the training flag at step 880. If the training flag indicates successful training at step 880, transceiver unit 710 proceeds if necessary to select another band for training at step 854. If the training flag indicates no successful training at step 880, transceiver unit 710 selects a lower baud rate at step 882 and proceeds with another training session at the lower baud rate at step 858.

Upon storing profile information 824 at step 870 and setting the training flag at step 872, transceiver unit 710 may determine at step 890 to attempt training at a higher rate as selected at step 892. Training at a higher rate may depend upon maximum rate 834 or other subscriber information that limits the maximum data rate for a particular line. Also, the selection of a higher baud rate at step 892 may depend on margin 836 computed at step 866. In a particular embodiment, a large margin 836 may cause transceiver unit 710 to skip an interim baud rate and select a higher baud rate at step 892 to further decrease training time. Upon selecting a higher baud rate, transceiver unit 710 proceeds with a training session at the higher baud rate at step 858.

If transceiver unit 710 cannot or does not select a higher baud rate for training at step 890, the method determines if all bands have been trained at step 894 and, if not, continues with step 854 to select the next band for training. The method ends after all bands for the line are trained and all associated profile information 824 for each band stored.

FIG. 21 is a flow chart of a method for establishing data communication using stored profile information 824. Although this method is described generally with reference to the architecture illustrated in FIG. 15, this method applies to any architecture or operation of communication system 10. Moreover, this method applies to any XDSL transceiver device located at a central office, remote terminal, point of presence of a service provider, customer premises, or other location that is coupled to a line whose physical and/or electrical parameters can be characterized using profile information 824 stored in profile table 124.

The method begins at step 900 where communication server 700 receives a request for service using an associated POTS filter module 704 and/or LIM 702. LIM controller 708 notifies system controller 712 of the request for service using serial management bus 722. In response, system controller 712 determines subscriber information 820 (e.g., subscriber line 826, subscriber ID 828, circuit ID 830) at step 902 and determines the subscriber's logical modem pool 832 at step 904 by accessing database 120 containing profile table 124. System controller 712 selects an available transceiver unit 710 at step 906 and causes the associated LIM 702 to couple the line to the selected transceiver unit 710 at step 908.

Steps 900–908 may implement the digital off-hook and over-subscription capabilities of communication server 700. However, in a CPE environment, steps 900–908 may be unnecessary, especially if there is a one-to-one or known association between lines and transceiver units. In the CPE environment, a request for service received at step 900 may be a local indication that the subscribers' communication equipment desires to establish XDSL communication.

In either embodiment, the selected transceiver unit 710 retrieves profile information 824 from profile table 124 maintained at database 120 in system controller 712 at step 910. In a particular embodiment, microcontroller 770 in transceiver unit 710 communicates with system controller 712 using serial management bus 722 to receive information stored in database 120. As described above with reference to FIG. 19, this information indexed by subscriber information 820 may include maximum rate 834, margin 836, or any variety of coefficients/parameters 838 (e.g., filter coefficients, equalizer tab coefficients, sub-band weights), or other suitable information that characterizes the line and the appropriate communication parameters for transceiver unit 710. Upon receiving profile information 824 over serial management bus 722, transceiver unit 710 loads this information into suitable registers 711 at step 912. In a particular embodiment, microcontroller 770 passes profile information 824 to registers 711 associated with at least one digital signal processor in chipset 766. Upon receiving and loading profile information 824 from profile table 124, transceiver unit 710 prepares to communicate data using maximum rate 834, margin 836, and coefficients/parameters 838 specific to the line.

In a particular embodiment, transceiver unit 710 performs a test at a selected baud rate to confirm the quality of the line and the accuracy or effectiveness of profile information 824 retrieved from profile table 124 at step 914. This test may be a measure of signal strength and/or noise to determine a line margin, a bit error rate (BER) test, or any other measurement or method to determine the quality or characteristics of the line. If transceiver unit 710 passes the test as determined at step 916, then transceiver unit 710 proceeds to communicate data associated with the session at step 918. If transceiver unit 710 does not pass the test as determined at step 916, then the method determines whether the baud rate and/or profile information 824 should be adjusted at step 920. If the baud rate and/or profile information 824 are to be adjusted, transceiver unit 710 proceeds to lower the baud rate and/or adjust profile information 824 at step 922 in preparation for another test. For example, transceiver 710 may simply lower the baud rate at step 922 and perform a confirming test at step 914 without a significant sacrifice in time to train the line. Transceiver unit 710 may also make adjustments in profile information 824, with or without a baud rate adjustment, to retrain the line.

If the baud rate and/or profile information should not or cannot be adjusted at step 920, then the method determines whether full retraining of the line is appropriate at step 922. If full retraining is appropriate, the method proceeds to step 854 in FIG. 20 to perform retraining to update and modify profile information 824 maintained in profile table 124. Communication server 700 may perform retraining of the line at periodic intervals or when physical or electrical characteristics of the line indicate a need for retraining.

After communicating data at step 918, the method determines if transceiver unit 710 has been idle for a predetermined period of time at step 924. If transceiver unit 710 has been idle, system controller 712 retrieves profile information 824 from registers 711 and stores this information in profile table 124 at step 926. It is important that system controller 712 retrieve modified or updated profile information 824 stored in registers 711 of transceiver unit 710 to maintain the most recent information for the line in profile table 124. System controller 712 then releases transceiver unit 710 at step 928.

If more data for the communication session is received at step 930, the method proceeds to step 906 and selects another available transceiver unit 710 to proceed with communication of the additional data. If more data is not received at step 930 and a timeout occurs at step 932, then the method ends. Therefore, as long as the line maintains communication activity without timing out at step 932; communication server 700 will continue to support data communication using one or more transceiver units 710 depending on the bursty character of the session. The idle time (step 924) and timeout (step 932) are chosen to maximize the efficient use of transceiver units 710 in communication server 700.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A communication server coupled to a plurality of twisted pair lines, the communication server comprising:
   a plurality of XDSL transceiver units;
   a line profile table having pre-stored profile information that reflects electrical parameters of each of a plurality of twisted pair lines for XDSL service; and
   a system controller operable to retrieve profile information for a twisted pair line from the line profile table, the system controller further operable to provide the retrieved profile information to an XDSL transceiver unit coupled to the twisted pair line.

2. The communication server of claim 1, further comprising a plurality of line interface modules coupled to the twisted pair lines and the XDSL transceiver units, wherein the system controller directs a line interface module to couple the twisted pair line to the XDSL transceiver unit.

3. The communication server of claim 1, further comprising a network interface coupled to the XDSL transceiver unit.

4. The communication server of claim 1, wherein the system controller communicates with the XDSL transceiver units using a serial management bus.

5. The communication server of claim 1, wherein each XDSL transceiver unit includes at least one digital signal processor having a plurality of registers, wherein the system controller loads profile information into the registers of the digital signal processor of the XDSL transceiver unit.

6. The communication server of claim 1, wherein the line profile table stores profile information in non-volatile memory.

7. The communication server of claim 1, wherein the line profile table resides on the system controller.

8. The communication server of claim 1, wherein profile information for a twisted pair line comprises a plurality of filter coefficients that reflect physical parameters of the twisted pair line.

9. The communication server of claim 1, wherein profile information for a twisted pair line comprises:
   a plurality of filter coefficients that reflect physical parameters of the twisted pair line; and
   an associated data rate for the twisted pair line.

10. The communication server of claim 1, wherein profile information for a twisted pair line comprises:
   a plurality of filter coefficients that reflect physical parameters of the twisted pair line;
   an associated data rate for the twisted pair line; and
   a margin for the twisted pair line representing the difference between a current or expected signal strength and a minimum signal strength to maintain communication.

11. The communication server of claim 1, wherein profile information for a twisted pair line comprises:
   a plurality of upstream filter coefficients for the twisted pair line; and
   a plurality of downstream filter coefficients for the twisted pair line.

12. The communication server of claim 1, wherein the line profile table comprises profile information indexed by subscriber information for each twisted pair line.

13. The communication server of claim 1, wherein each twisted pair line forms a local loop to a subscriber.

14. The communication server of claim 1, wherein the XDSL transceiver unit uses profile information to perform carrier-less amplitude phase modulation to communicate information.

15. The communication server of claim 1, wherein profile information comprises physical or electrical characteristics of each twisted pair line.

16. The communication server of claim 1, wherein the transceiver units are operable to test the quality of the retrieved profile information and adjust the profile information if the profile information is not of sufficient quality.

17. A communication device, comprising:
   an XDSL transceiver unit operable to couple to a twisted pair line;
   a plurality of registers associated with the XDSL transceiver unit; and
   a microcontroller coupled to the XDSL transceiver unit and the registers, the microcontroller operable to receive pre-stored profile information that reflects electrical parameters of the twisted pair line for XDSL service from an external device, the microcontroller further operable to store the profile information in the registers in preparation for XDSL communication using the twisted pair line.

18. The communication device of claim 17, wherein the microcontroller is further operable to direct the XDSL transceiver unit to perform a test on the twisted pair line after storing the profile information in the registers.

19. The communication device of claim 17, wherein the external device comprises non-volatile memory.

20. The communication device of claim 17, wherein the external device comprises a system controller.

21. The communication device of claim 17, wherein the microcontroller communicates with the external device using a serial management bus.

22. The communication device of claim 17, wherein the registers are associated with at least one digital signal processor in the XDSL transceiver unit.

23. The communication device of claim 17, wherein profile information comprises a plurality of filter coefficients that reflect physical parameters of the twisted pair line.

24. The communication device of claim 17, wherein profile information comprises:
   a plurality of filter coefficients that reflect physical parameters of the twisted pair line; and
   an associated data rate for the twisted pair line.

25. The communication device of claim 17, wherein profile information comprises:
   a plurality of filter coefficients that reflect physical parameters of the twisted pair line;
   an associated data rate for the twisted pair line; and
   a margin for the twisted pair line representing the difference between a current or expected signal strength and a minimum signal strength to maintain communication.

26. The communication device of claim 17, wherein profile information comprises:
   a plurality of upstream filter coefficients for the twisted pair line; and
   a plurality of downstream filter coefficients for the twisted pair line.

27. The communication device of claim 17, wherein the twisted pair line forms a local loop to a subscriber.

28. The communication device of claim 17, wherein the XDSL transceiver unit uses profile information to perform carrier-less amplitude phase modulation to communicate information.

29. The XDSL transceiver unit of claim 17, wherein profile information comprises physical or electrical characteristics of the twisted pair line.

30. The communication device of claim 17, wherein the XDSL transceiver unit is operable to test the quality of the retrieved profile information and adjust the profile information if the profile information is not of sufficient quality.

31. A method for communicating using a plurality of XDSL transceiver units and a plurality of twisted pair lines, the method comprising:
   storing profile information that reflects electrical parameters of each of a plurality of twisted pair lines for XDSL service;
   coupling an XDSL transceiver unit to a twisted pair line;
   retrieving the previously stored profile information for the twisted pair line; and
   providing the retrieved profile information to the XDSL transceiver unit coupled to the twisted pair line in preparation for XDSL communication.

32. The method of claim 31, further comprising:
   receiving a request for service on the twisted pair line; and
   directing a line interface module to couple the twisted pair line to the XDSL transceiver unit.

33. The method of claim 31, wherein providing the retrieved profile information comprises communicating the retrieved profile information from a system controller to the XDSL transceiver unit using a serial management bus.

34. The method of claim 31, wherein providing the retrieved profile information comprises loading the retrieved profile information into a plurality of registers associated with at least one digital signal processor in the XDSL transceiver unit.

35. The method of claim 31, wherein storing profile information comprises storing profile information in non-volatile memory.

36. The method of claim 31, wherein storing profile information comprises storing profile information at a system controller.

37. The method of claim 31, wherein profile information for a twisted pair line comprises a plurality of filter coefficients that reflect physical parameters of the twisted pair line.

38. The method of claim 31, wherein profile information for a twisted pair line comprises:
   a plurality of filter coefficients that reflect physical parameters of the twisted pair line; and
   an associated data rate for the twisted pair line.

39. The method of claim 31, wherein profile information for a twisted pair line comprises:
   a plurality of filter coefficients that reflect physical parameters of the twisted pair line;
   an associated data rate for the twisted pair line; and
   a margin for the twisted pair line representing the difference between a current or expected signal strength and a minimum signal strength to maintain communication.

40. The method of claim 31, wherein profile information for a twisted pair line comprises:
   a plurality of upstream filter coefficients for the twisted pair line; and
   a plurality of downstream filter coefficients for the twisted pair line.

41. The method of claim 31, wherein each twisted pair line forms a local loop to a subscriber.

42. The method of claim 31, further comprising the step of performing carrier-less amplitude phase modulation using the retrieved profile information.

43. The method of claim 31, wherein profile information comprises physical or electrical characteristics of each twisted pair line.

44. The method of claim 31, further comprising:
   testing the quality of the retrieved profile information; and
   adjusting the profile information if the profile information is not of sufficient quality.

45. A method for communicating performed on an XDSL transceiver unit, comprising:
   coupling an XDSL transceiver unit to a twisted pair line;
   receiving pre-stored profile information that reflects electrical parameters of the twisted pair line for XDSL service from an external device; and
   storing the received profile information in the XDSL transceiver unit in preparation for XDSL communication using the twisted pair line.

46. The method of claim 45, wherein coupling the XDSL transceiver unit to the twisted pair line comprises coupling the XDSL transceiver unit to the twisted pair line using a line interface module.

47. The method of claim 45, further comprising the step of performing a test on the twisted pair line after storing the received profile information in the XDSL transceiver unit.

48. The method of claim 45, wherein the external device comprises a system controller.

49. The method of claim 45, wherein receiving profile information comprises receiving profile information from the external device using a serial management bus.

50. The method of claim 45, wherein storing the received profile information in the XDSL transceiver unit comprises storing the received profile information in a plurality of registers associated with at least one digital signal processor in the XDSL transceiver unit.

51. The method of claim 45, wherein profile information comprises a plurality of filter coefficients that reflect physical parameters of the twisted pair line.

52. The method of claim 45, wherein profile information comprises:
   a plurality of filter coefficients that reflect physical parameters of the twisted pair line; and
   an associated data rate for the twisted pair line.

53. The method of claim 45, wherein profile information comprises:
   a plurality of filter coefficients that reflect physical parameters of the twisted pair line;
   an associated data rate for the twisted pair line; and
   a margin for the twisted pair line representing the difference between a current or expected signal strength and a minimum signal strength to maintain communication.

54. The method of claim 45, wherein profile information comprises:
   a plurality of upstream filter coefficients for the twisted pair line; and
   a plurality of downstream filter coefficients for the twisted pair line.

55. The method of claim 45, wherein the twisted pair line forms a local loop to a subscriber.

56. The method of claim 45, further comprising the step of performing carrier-less amplitude phase modulation using the retrieved profile information.

57. The method of claim 45, wherein profile information comprises physical or electrical characteristics of the twisted pair line.

58. The method of claim 45, further comprising:
testing the quality of the received profile information; and
adjusting the profile information if the profile information is not of sufficient quality.

* * * * *